(12) United States Patent
Shirakawa

(10) Patent No.: US 7,912,680 B2
(45) Date of Patent: Mar. 22, 2011

(54) DIRECTION-OF-ARRIVAL ESTIMATION APPARATUS

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/324,382

(22) Filed: Nov. 26, 2008

(65) Prior Publication Data

US 2009/0243933 A1 Oct. 1, 2009

(30) Foreign Application Priority Data

Mar. 28, 2008 (JP) ................................. 2008-088091

(51) Int. Cl.
*G06F 15/00* (2006.01)
*G01S 5/04* (2006.01)

(52) U.S. Cl. ....................................... 702/196; 342/444

(58) Field of Classification Search .................. 702/189, 702/196, 190; 342/118, 373, 377, 344, 444; 367/118, 130
See application file for complete search history.

(56) References Cited

U.S. PATENT DOCUMENTS

| | | | | |
|---|---|---|---|---|
| 5,418,892 A | * | 5/1995 | Aghajan et al. | 345/418 |
| 5,945,940 A | * | 8/1999 | Cuomo | 342/90 |
| 7,068,221 B2 | * | 6/2006 | Xin | 342/432 |
| 7,782,249 B2 | * | 8/2010 | Shirakawa | 342/147 |
| 2003/0147539 A1 | * | 8/2003 | Elko et al. | 381/92 |
| 2005/0285788 A1 | | 12/2005 | Xin | |
| 2006/0238403 A1 | * | 10/2006 | Golan et al. | 342/62 |
| 2008/0122681 A1 | | 5/2008 | Shirakawa | |

FOREIGN PATENT DOCUMENTS

| | | |
|---|---|---|
| EP | 1903348 | 3/2008 |
| WO | 2004104620 | 12/2004 |
| WO | 2005003676 | 1/2005 |
| WO | 2006067869 | 6/2006 |

OTHER PUBLICATIONS

European Search Report dated Sep. 29, 2010, from the corresponding European Application No. 08170259.

* cited by examiner

*Primary Examiner* — Bryan Bui
(74) *Attorney, Agent, or Firm* — Katten Muchin Rosenman LLP

(57) ABSTRACT

A direction-of-arrival estimation apparatus has a signal vector generation unit operable to generate a signal vector v composed of N baseband signals $v_1$ to $v_N$ from arriving signals received from a target by N sensors. The direction-of-arrival estimation apparatus includes a Hankel matrix generation unit operable to preferentially set an order of a column of a matrix at a natural number M where $1 \leq M$ and $M \leq (N-1)/2$ and generate an $(N-M) \times M$ matrix $R_{f1}$, $R_{f2}$, $R_{b1}$, or $R_{b2}$ from elements $v_1$ to $v_{N-1}$ of the signal vector. The direction-of-arrival estimation apparatus also includes an estimation unit operable to generate a matrix R using the matrices $R_{f1}$, $R_{f2}$, $R_{b1}$, or $R_{b2}$, divide the matrix R into two submatrices $R_1$ and $R_2$ by $R = [R_1 | R_2]^T$, and estimate a direction of arrival of the arriving signal based on the submatrices $R_1$ and $R_2$.

10 Claims, 12 Drawing Sheets

FIG. 5A FFT-DBF
FIG. 5B FBSS-MUSIC
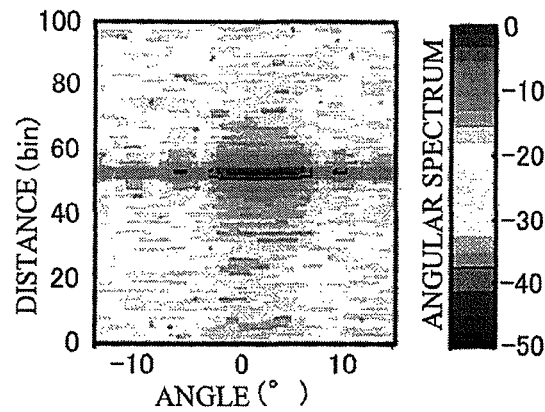
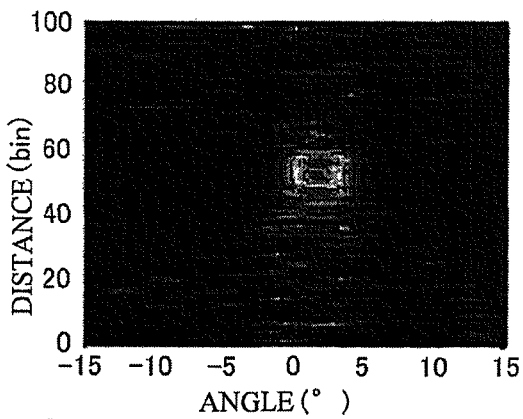
FIG. 5C COMPARATIVE EXAMPLE
FIG. 5D SECOND EMBODIMENT
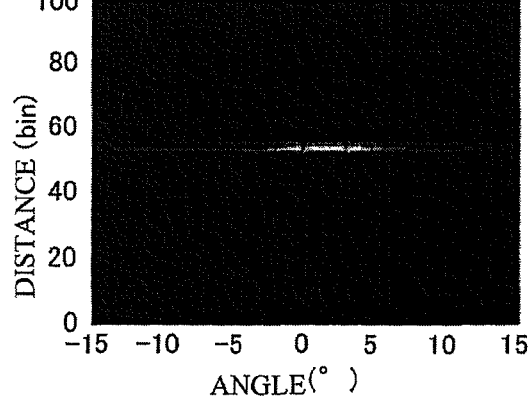
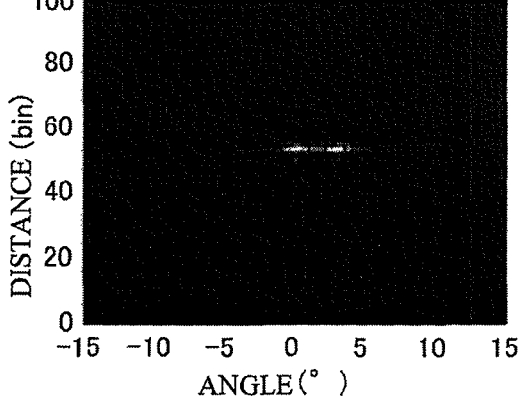

US 7,912,680 B2

DIRECTION-OF-ARRIVAL ESTIMATION APPARATUS

CROSS-REFERENCE TO RELATED APPLICATION

This application is based upon and claims the benefit of priority of the prior Japanese Patent Application No. 2008-088091, filed on Mar. 28, 2008, the entire contents of which are incorporated herein by reference.

FIELD

The present invention generally relates to a direction-of-arrival estimation apparatus, a direction-of-arrival estimation method, and a direction-of-arrival estimation program, and more particularly to a direction-of-arrival estimation apparatus, a direction-of-arrival estimation method, and a direction-of-arrival estimation program for estimating a direction in which an arriving signal has traveled from a target with use of a plurality of sensors.

BACKGROUND

A digital beam forming method (DBF), a subspace method (SSM), a maximum likelihood method (ML), and the like are used to estimate a direction of arrival (DOA) of an arriving signal from a target (signal transmitting source or signal reflection object) with use of a plurality of sensors.

In order to perform a high-speed DOA estimation with high accuracy, International Patent Publication No. WO2006/067869 (Patent Document 1) discloses a technique of estimating a direction of arrival with use of a spatial average covariance matrix in which correlation vectors of baseband signals are combined.

The computation speed and robustness of the DOA estimation disclosed in Patent Document 1 can be improved in some aspects. It is, thus, an object of the present invention to provide a direction-of-arrival estimation apparatus, a direction-of-arrival estimation method, and a direction-of-arrival estimation program capable of high-speed estimation for a direction of arrival with high accuracy.

SUMMARY

According to an aspect of the present invention, there is provided a direction-of-arrival estimation apparatus capable of high-speed direction-of-arrival estimation with high accuracy. The direction-of-arrival estimation apparatus has a signal vector generation unit operable to generate a signal vector $v$ composed of N baseband signals $v_1$ to $v_N$ from arriving signals received from a target by N sensors. The direction-of-arrival estimation apparatus includes a Hankel matrix generation unit operable to preferentially set an order of a column of a matrix at a natural number M where $1 \leq M$ and $M \leq (N-1)/2$ and to generate at least one of (N–M)×M matrices $R_{f1}$, $R_{f2}$, $R_{b1}$, and $R_{b2}$ from elements $v_1$ to $v_{N-1}$ or $v_2$ to $v_N$ of the signal vector. The matrix $R_{f1}$ is an (N–M)×M Hankel matrix including elements $v_1$ to $v_{N-1}$ of the signal vector. The matrix $R_{f2}$ is an (N–M)×M Hankel matrix including elements $v_2$ to $v_N$ of the signal vector. The matrix $R_{b1}$ is an (N–M)×M Hankel matrix including complex conjugate elements $v_1^*$ to $v_{N-1}^*$ of the signal vector. The matrix $R_{b1}$ is defined by $R_{b1} = J_{N-M} R_{f1}^* J_M$ where $J_{N-M}$ is an (N–M)×(N–M) anti-diagonal unit matrix and $J_M$ is an M×M anti-diagonal unit matrix. The matrix $R_{b2}$ is an (N–M)×M Hankel matrix including complex conjugate elements $v_2^*$ to $v_N^*$ of the signal vector. The matrix $R_{b2}$ is defined by $R_{b2} = J_{N-M} R_{f2}^* J_M$ where $J_{N-M}$ is an (N–M)×(N–M) anti-diagonal unit matrix and $J_M$ is an M×M anti-diagonal unit matrix. The direction-of-arrival estimation apparatus also includes an estimation unit operable to generate a matrix R using at least one of the matrices $R_{f1}$, $R_{f2}$, $R_{b1}$, and $R_{b2}$. The estimation unit is operable to divide the matrix R into two submatrices $R_1$ and $R_2$ by $R = [R_1 | R_2]^T$ and estimate a direction of arrival of the arriving signal based on the submatrices $R_1$ and $R_2$.

According to another aspect of the present invention, there is provided a direction-of-arrival estimation method capable of high-speed direction-of-arrival estimation with high accuracy. In this direction-of-arrival estimation method, N baseband signals $v_1$ to $v_N$ are generated from arriving signals received from a target by N sensors. An order of a column of a matrix is preferentially set at a natural number M where $1 \leq M$ and $M \leq (N-1)/2$. At least one of (N–M)×M matrices $R_{f1}$, $R_{f2}$, $R_{b1}$, and $R_{b2}$ is generated from elements $v_1$ to $v_{N-1}$ or $v_2$ to $v_N$ of the signal vector. A matrix R is generated using of at least one of the matrices $R_{f1}$, $R_{f2}$, $R_{b1}$, and $R_{b2}$. The matrix R is divided into two submatrices $R_1$ and $R_2$ by $R = [R_1 | R_2]^T$. A direction of arrival of the arriving signal is estimated based on the submatrices $R_1$ and $R_2$.

According to another aspect of the present invention, there is provided a direction-of-arrival estimation program for executing the above procedure with a computer.

According to a direction-of-arrival estimation apparatus, a direction-of-arrival estimation method, and a direction-of-arrival estimation program of the present invention, a direction of arrival can be estimated at a high speed with high accuracy.

BRIEF DESCRIPTION OF THE DRAWINGS

FIGS. 5A to 5D are diagrams showing angular spectra computed by indicated methods;

DESCRIPTION OF EMBODIMENTS

First, there will be described some factors to allow DOA estimation using the technique disclosed in Patent Document 1 to be improved in computation speed and robustness. In the following description, a superscript "H" following a matrix or vector represents complex conjugate transpose, a superscript "T" following a matrix or vector represents transpose, and a superscript "*" complex conjugate. A superscript "−1" following a matrix represents an inverse matrix. Furthermore, a matrix $J_P$ is a P×P anti-diagonal unit matrix in which the anti-diagonal elements are equal to one while all elements not on the anti-diagonal are equal to zero. A matrix $I_P$ is a P×P unit matrix. A matrix $0_{P \times Q}$ is a P×Q zero matrix, and a matrix $0_P$ is a P×P zero square matrix.

Figure 1:
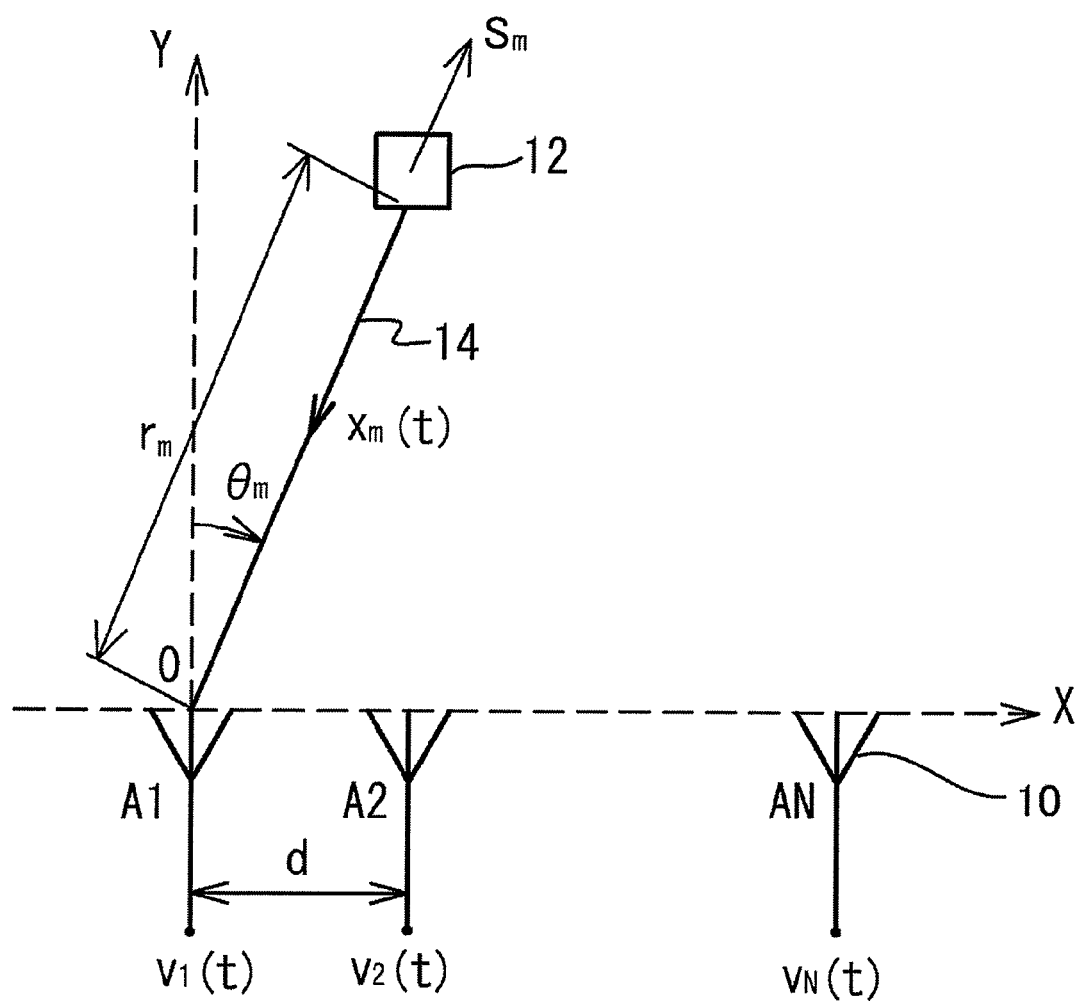
FIG. 1 is a diagram showing receiving sensors.

FIG. 1 is a diagram showing receiving sensors (e.g., antennas 10) according to the present invention. In FIG. 1, N antennas $A_1$ to $A_N$ are arranged at equal intervals d on a line in a direction of an X-axis. These antennas 10 form a uniform linear array antenna (ULA). It is assumed that each of M independent targets 12 (signal transmission sources or signal reflection objects) is located at a distance $r_m$ from the antenna 10 and an angle $\theta_m$. The angle $\theta_m$ is set to be zero in the positive direction of a Y-axis and increases clockwise. For the sake of brevity, only one target is illustrated in FIG. 1 on behalf of the M independent targets 12.

For convenience of explanation, a radar using a high-frequency signal having a wavelength λ as a carrier signal will be described as a specific apparatus. In this example, the radar transmits a detection signal to targets from a transmitting antenna, which is provided at a location spatially separated from the receiving antennas 10. The antennas 10 receive echo signals generated by reflection of the detection signal on the targets. Then the radar mixes the echo signals with the transmission signal and demodulates the resultant signals into baseband signals. Furthermore, the radar conducts appropriate signal processing to estimate the position or speed of each target. With the arrangement shown in FIG. 1, echo signals $x_m(t)$ from the M targets (M≦N−1) arrive at each antenna 10. Here, m=1, . . . , M, and t represents time.

At that time, an input signal from the nth antenna $A_n$ is demodulated to obtain a signal $v_n(t)$ given by $$v_n(t) = \sum_{m=1}^{M} x_m(t) \exp(j\phi_{n,m}) + n_n(t) \quad (1)$$

$$\phi_{n,m} \equiv \frac{2\pi}{\lambda}(n-1)d \sin\theta_m \quad (2)$$

where $x_m(t)$ is a baseband signal, $n_n(t)$ is an additive Gaussian noise, and λ is a wavelength of a carrier signal.

The signals, for n=1 to N, $v_n(t)$ can be represented as a baseband signal vector (hereafter refereed as signals, a signal vector, or the like) defined by $$v(t) = \begin{bmatrix} v_1(t) \\ \vdots \\ v_N(t) \end{bmatrix} = \begin{bmatrix} \sum_{m=1}^{M} \dot{x}_m(t) \exp(j\varphi_{1,m}) + n_1(t) \\ \vdots \\ \sum_{m=1}^{M} x_m(t) \exp(j\varphi_{N,m}) + n_N(t) \end{bmatrix} = Ax(t) + n(t) \quad (3)$$

where $$A \equiv [a(\theta_1), \ldots, a(\theta_M)] = \begin{bmatrix} \exp(j\phi_{1,1}) & \cdots & \exp(j\phi_{1,M}) \\ \vdots & \ddots & \vdots \\ \exp(j\phi_{N,1}) & \cdots & \exp(j\phi_{N,M}) \end{bmatrix} \quad (4)$$

$$x(t) \equiv [x_1(t) \ldots x_M(t)]^T \quad (5)$$

$$n(t) \equiv [n_1(t) \ldots n_N(t)]^T \quad (6)$$

Assuming that there is no correlation between x(t) and n(t), a covariance matrix $R_{vv}$ of v(t) is computed from the formula (3) by $$R_{vv} \equiv E\{v(t)v^H(t)\} = AR_{xx}A^H + \sigma^2 I \quad (7)$$

where $R_{xx}$ is a covariance matrix of the baseband signal vector x(t). $R_{xx}$ is defined by $$R_{xx} \equiv E[x(t)x^H(t)] \quad (8)$$

The DOA estimation is performed on $R_{vv}$.

Since radar is used in the present embodiment, the ULA receives signals that have been transmitted from the same signal source and reflected from the individual targets. Thus, those received signals have a high coherence. Therefore, the rank of $R_{vv}$, which is an N×N matrix, degenerates into one. In such a situation, it is difficult to estimate DOA from $R_{vv}$.

Accordingly, forward spatial smoothing (FSS) is used to recover the rank of $R_{vv}$. In forward spatial smoothing, (N−L+1) submatrices having the order of L×L (L<N) are extracted along the main diagonal direction from $R_{vv}$. Those submatrices are summed up and averaged to recover the rank of $R_{vv}$.

Furthermore, backward spatial smoothing (BSS), which inverses a reference point of the ULA and performs operation similar to FSS, may also be used to recover the rank of $R_{vv}$. Usually, forward backward spatial smoothing (FBSS), which is a combination of FSS and BSS, is used to recover the rank of $R_{vv}$.

For example, DOA estimation using Capon method is performed by using $$P_{Capon}(\theta) = \frac{1}{a^H(\theta)[R_{vv}^{FBSS}]^{-1}a(\theta)} \quad (9)$$

where $R_{vv}^{FBSS}$ is a matrix obtained by applying FBSS to $R_{vv}$, and a(θ) is an L-order mode vector (or an array mode vector) and has a structure similar to that of the vector elements $a(\theta_m)$ in the formula (4).

With a multiple signal classification (MUSIC) method, eigenvalue decomposition is performed on $R_{vv}^{FBSS}$ by using $$R_{vv}^{FBSS} = E_S \Lambda_S E_S^H + \sigma^2 E_N E_N^H \quad (10)$$

Then a matrix $E_N$ is calculated, and DOA estimation is performed by using $$P_{MUSIC}(\theta) = \frac{a^H(\theta)a(\theta)}{a^H(\theta)E_N E_N^H a(\theta)} \quad (11)$$

Specifically, in the formula (9) or (11), a mode vector a(θ) including a parameter θ is defined by a(θ)=[1, exp(j2πα sin θ), . . . , exp(j2πα(L−1)sin θ)]$^T$ where α=d/λ. While the parameter θ is scanned, angle information included in the matrix is examined by computation using the formula (9) or (11). Thus, a direction of arrival is estimated.

Usually, a signal covariance matrix inevitably includes a noise component $\sigma^2 I$ as seen in the formula (7). In order to reduce influence from the noise component for improving estimation accuracy of DOA, the following process is performed in the technique disclosed in Patent Document 1. Specifically, signals received by the respective antennas, which form a ULA, are demodulated to generate baseband signals. Then correlation vectors are computed from the baseband signals to generate a pseudo covariance matrix. Thereafter, a propagator matrix is generated from the pseudo covariance matrix. DOA estimation is performed by using the propagator matrix. This estimation method will be described below in detail.

For the sake of brevity, the following description is focused only on FSS. A correlation vector $r_{v1}$ of the baseband signals is computed by $$r_{v1} = E[v(t)v_N^*(t)] \tag{11}$$

Hereinafter, M denotes the maximum number of targets of which direction of arrival can be estimated with a ULA formed by N antennas. For example, M is defined as a maximum natural number not more than (N−1)/2.

Next, the elements of $r_{v1}$ are rearranged to generate a matrix $R_{f1}$ defined by $$R_{f1} = \begin{pmatrix} r_{v1}^T(1) \\ \vdots \\ r_{v1}^T(N-M) \end{pmatrix} \tag{13}$$

In this case, $r_{v1}(k)$ is given by $$r_{v1}(k) = E \begin{pmatrix} v_k(t)v_N^*(t) \\ \vdots \\ v_{k+M-1}(t)v_N^*(t) \end{pmatrix} \tag{14}$$

where k=1, . . . , N−M. Therefore, simple manipulations reveal that $R_{f1}$ can be represented in the form of $R_{f1}$=AX. Hereafter, symbol "t" representing an instantaneous time is accordingly omitted for simplicity. Specifically, the matrix R defined by $$R = [R_{f1}] \tag{15}$$

includes the same phase information as the covariance matrix $R_{vv}$ to which spatial smoothing is applied.

An example in which N=5 and M=2 will be described below. In this example, the matrix R is computed as $$R = \begin{pmatrix} v_1 v_5^* & v_2 v_5^* \\ v_2 v_5^* & v_3 v_5^* \\ v_3 v_5^* & v_4 v_5^* \end{pmatrix} \tag{16}$$

Next, the matrix R is divided into an M×M submatrix $R_1$ and an (N−2M)×M submatrix $R_2$ as shown by $$R \equiv \begin{pmatrix} R_1 \\ R_2 \end{pmatrix} = \begin{bmatrix} \begin{pmatrix} v_1 v_5^* & v_2 v_5^* \\ v_2 v_5^* & v_3 v_5^* \end{pmatrix} \\ (v_3 v_5^* \quad v_4 v_5^*) \end{bmatrix} \tag{17}$$

Then, using the submatrices $R_1$ and $R_2$, an M×(N−2M) matrix Γ is generated by $\Gamma = (R_1 R_1^H)^{-1} R_1 R_2^H$.

Subsequently, using the matrix Γ and an (N−2M)×(N−2M) unit matrix $I_{N-2M}$, an (N−M)×(N−2M) propagator matrix Π is generated by $\Pi = [\Gamma \mid -I_{N-2M}]^T$.

For example, using the propagator matrix Π, an (N−M)×(N−M) core matrix Ω is defined by $\Omega = \Pi(\Pi^H \Pi)^{-1} \Pi^H$. For example, using this core matrix Ω and the array mode vector a(θ) defined by $a(\theta) = [1, \exp(j2\pi\alpha \sin \theta), \ldots, \exp(j2\pi\alpha(N-M-1)\sin \theta)]^T$ where α=d/λ and an angular spectrum P(θ) is defined by $$P(\theta) = \frac{a^H(\theta)a(\theta)}{a^H(\theta)\Omega a(\theta)} \tag{18}$$

Then, the angular spectrum P(θ) is computed while the parameter θ is scanned. An arrival angle $\theta_m$ of the arriving signal can be obtained from a position of a peak in the angular spectrum P(θ). Alternatively, an arrival angle $\theta_m$ of the arriving signal can be obtained from a solution of an algebraic equation $(a(1/z)^T \Omega a(z)=0)$ where $z=\exp(j2\pi\alpha \sin(\theta))$ and α=d/λ.

As described above, according to Patent Document 1, the matrix R is computed as shown by the formulas (15) and (16), and the propagator matrix Π is then computed from the matrix R. Thereafter, the core matrix Ω is computed to compute a direction of arrival.

For the sake of brevity, an example in which N=5 and M=2 as shown by the formula (16) will be described below. The matrix Γ, which is a primary part of the propagator matrix Π, can be represented by $$\Gamma \equiv (R_1 R_1^H)^{-1} R_1 R_2^H \tag{19}$$

$$= \left[ \begin{pmatrix} v_1 v_5^* & v_2 v_5^* \\ v_2 v_5^* & v_3 v_5^* \end{pmatrix} \begin{pmatrix} v_5 v_1^* & v_5 v_2^* \\ v_5 v_2^* & v_5 v_3^* \end{pmatrix} \right]^{-1} \begin{pmatrix} v_1 v_5^* & v_2 v_5^* \\ v_2 v_5^* & v_3 v_5^* \end{pmatrix} \begin{pmatrix} v_5 v_3^* \\ v_5 v_4^* \end{pmatrix}$$

$$= \frac{1}{|v_5|^2} \begin{pmatrix} |v_1|^2 + |v_2|^2 & v_1 v_2^* + v_2 v_3^* \\ v_2 v_1^* + v_3 v_2^* & |v_2|^2 + |v_3|^2 \end{pmatrix}^{-1} \begin{pmatrix} v_1 v_3^* & v_2 v_4^* \\ v_2 v_3^* & v_3 v_4^* \end{pmatrix}$$

$$= \frac{1}{|v_5|^2(|v_2|^2 - v_1 v_3^*|^2)} \begin{bmatrix} \cdots \\ \cdots \end{bmatrix}$$

To know phase components of vectors forming the matrix Γ is sufficient to perform DOA estimation. Thus, a factor $1/|v_5|^2$ multiplying the components in the formula (19) has no direct effect on the DOA estimation and may inhibit high-speed computation. Additionally, in practical computation, such a factor may cause cancellation of significant digits or rounding errors, thereby making it difficult to increase the accuracy of DOA estimation.

In view of the above discussion, a direction-of-arrival estimation apparatus according to the present invention performs DOA estimation with use of a matrix that does not include the above factor.

The order of the column of a matrix is preferentially set at a natural number M that meets 1≦M and M≦(N−1)/2, and the order of the row of the matrix is set at N−M. Elements $v_1$ to $v_{N-1}$ of the baseband signal vector v composed of N signals $v_1$ to $v_N$ are arranged as elements of the matrix to thereby generate a Hankel matrix $R_{f1}$ as defined by $$R_{f1} = \begin{pmatrix} v_1 & \cdots & v_M \\ \vdots & & \vdots \\ v_{N-M} & \cdots & v_{N-1} \end{pmatrix} \tag{20}$$

For example, in a case where N=5 and M=2, a Hankel matrix $R_{f1}$ is defined by $$R_{f1} = \begin{pmatrix} v_1 & v_2 \\ v_2 & v_3 \\ v_3 & v_4 \end{pmatrix} \quad (21)$$

Then, for example, a matrix R is defined as shown in the formula (22). The matrix R is divided into an M×M submatrix $R_1$ and an (N−2M)×M submatrix $R_2$.

$$R \equiv [R_{f1}] = \begin{pmatrix} v_1 & v_2 \\ v_2 & v_3 \\ v_3 & v_4 \end{pmatrix} \equiv \begin{pmatrix} R_1 \\ R_2 \end{pmatrix} = \begin{bmatrix} \begin{pmatrix} v_1 & v_2 \\ v_2 & v_3 \end{pmatrix} \\ (v_3 \quad v_4) \end{bmatrix} \quad (22)$$

Using those submatrices $R_1$ and $R_2$, an M×(N−2M) matrix Γ is computed by $$\Gamma \equiv (R_1 R_1^H)^{-1} R_1 R_2^H \quad (23)$$

$$= \left[ \begin{pmatrix} v_1 & v_2 \\ v_2 & v_3 \end{pmatrix} \begin{pmatrix} v_1^* & v_2^* \\ v_2^* & v_3^* \end{pmatrix} \right]^{-1} \begin{pmatrix} v_1 & v_2 \\ v_2 & v_3 \end{pmatrix} \begin{pmatrix} v_3^* \\ v_4^* \end{pmatrix}$$

$$= \begin{pmatrix} |v_1|^2 + |v_2|^2 & v_1 v_2^* + v_2 v_3^* \\ v_2 v_1^* + v_3 v_2^* & |v_2|^2 + |v_3|^2 \end{pmatrix}^{-1} \begin{pmatrix} v_1 v_3^* & v_2 v_4^* \\ v_2 v_3^* & v_3 v_4^* \end{pmatrix}$$

$$= \frac{1}{|(v_2)^2 - v_1 v_3^*|^2} \begin{bmatrix} \cdots \\ \cdots \end{bmatrix}$$

While the matrix in the formula (23) holds phase information to be used for DOA estimation, it does not include an extra factor $1/|v_5|^2$, which is included in the formula (19).

Thereafter, using the matrix Γ and an (N−2M)×(N−2M) unit matrix $I_{N-2M}$ as with the formula (17), a propagator matrix Π is generated by $\Pi = [\Gamma | -I_{N-2M}]^T$.

For example, using the propagator matrix Π, an (N−M)×(N−M) core matrix Ω is defined as $\Omega = \Pi(\Pi^H \Pi)^{-1} \Pi^H$. For example, using this core matrix Ω and the array mode vector a(θ) defined by $a(\theta) = [1, \exp(j2\pi\alpha \sin\theta), \ldots, \exp(j2\pi\alpha(N-M-1)\sin\theta)]^T$ where α=d/λ, an angular spectrum P(θ) is defined by $$P(\theta) = \frac{a^H(\theta) a(\theta)}{a^H(\theta) \Omega a(\theta)} \quad (24)$$

Then, the angular spectrum P(θ) is computed while the parameter θ is scanned. An arrival angle $\theta_m$ of the arriving signal can be obtained from a position of a peak in the angular spectrum P(θ). Alternatively, an arrival angle $\theta_m$ of the arriving signal can be obtained from a solution of an algebraic equation $(a(1/z)^T \Omega a(z) = 0)$ where $z = \exp(j2\pi\alpha \sin(\theta))$ and α=d/λ.

According to a direction-of-arrival estimation apparatus of the present invention, a matrix $R_{f1}$ as shown in the formula (21) (formula (20) in general) is used instead of the matrix $R_{f1}$ as shown in the formula (13). With the matrix $R_{f1}$ as shown in the formula (21), a matrix Γ generated by the formula (23) does not include a factor such as $1/|v_5|^2$ in the formula (19). Accordingly, computation of the matrix Γ and a propagator matrix Π can be performed at a high speed with high accuracy. Several embodiments based on the above principle of the present invention will be described below.

First Embodiment

Figure 2:
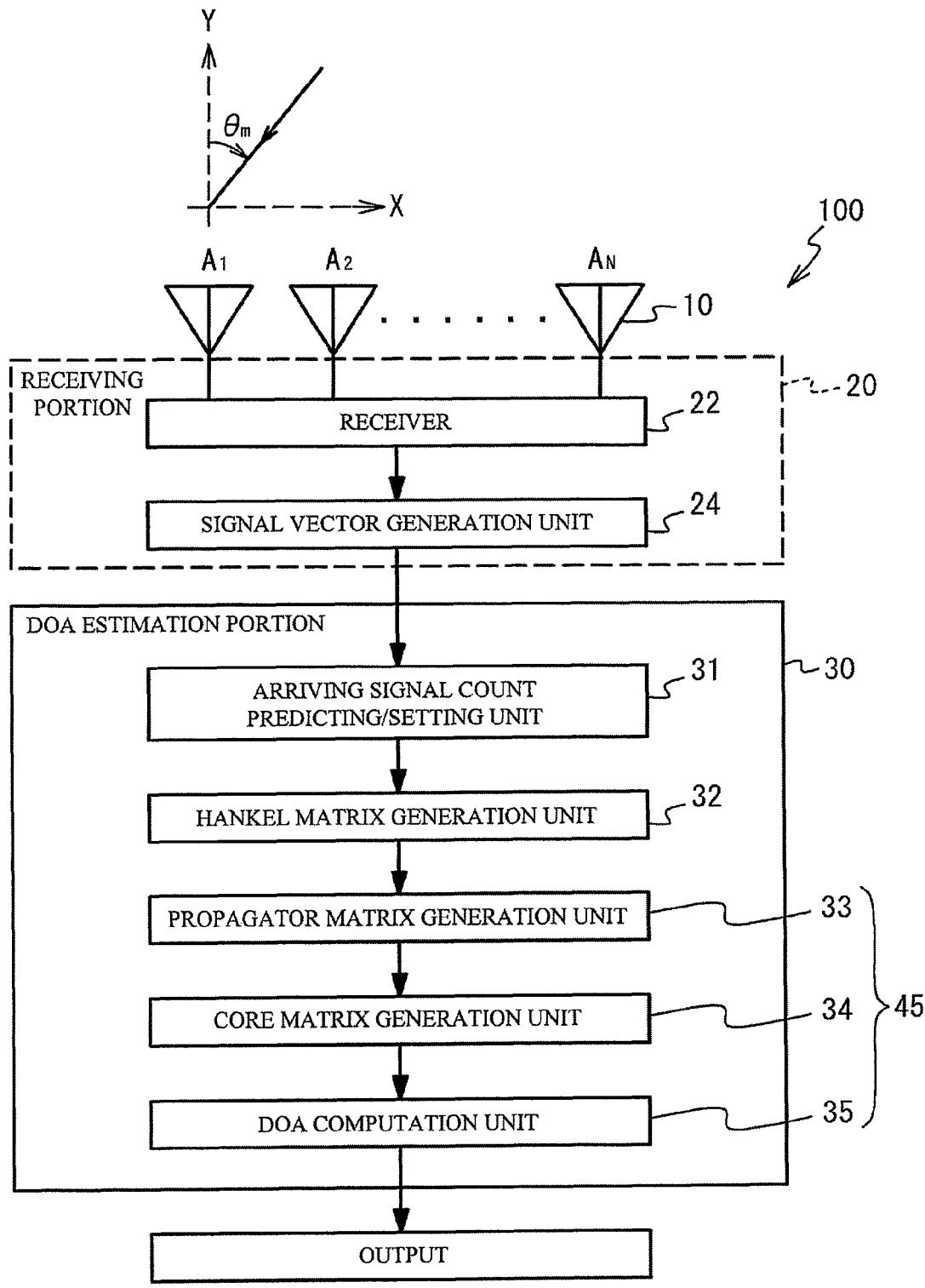
FIG. 2 is a block diagram showing a direction-of-arrival estimation apparatus according to a first embodiment of the present invention.
Figure 3:
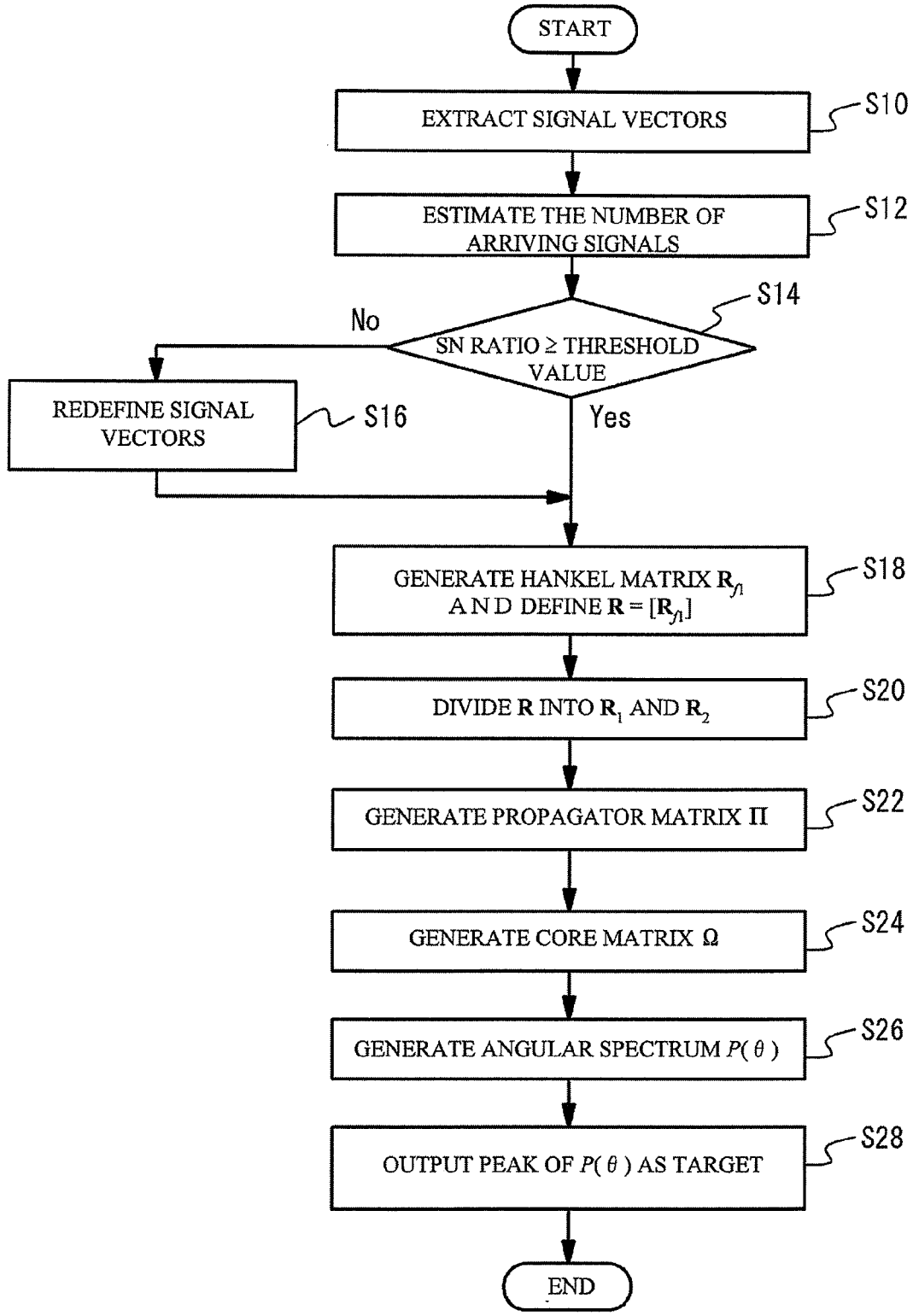
FIG. 3 is a flow chart showing processes performed in the direction-of-arrival estimation apparatus according to the first embodiment of the present invention.

FIG. 2 is a block diagram showing a direction-of-arrival estimation apparatus according to a first embodiment of the present invention. FIG. 3 is a flow chart showing processes performed in the direction-of-arrival estimation apparatus. The first embodiment of the present invention will be described with reference to FIGS. 2 and 3.

In FIG. 2, the direction-of-arrival estimation apparatus 100 includes a plurality of antennas 10 (antennas $A_1$ to $A_N$), a receiving portion 20, and a DOA estimation portion 30. The plurality of antennas 10 receive arriving signals from targets. The receiving portion 20 includes a receiver 22 and a signal vector generation unit 24. For example, the receiver 22 receives arriving signals with a carrier signal having a frequency of 76 GHz, demodulates them in accordance with a modulation method, and downconverts them into baseband signals having an appropriate band. Furthermore, the receiver 22 performs A/D conversion on those baseband signals into digital signals (hereinafter simply referred to as baseband signals). The signal vector generation unit 24 shapes baseband signals corresponding to each antenna as a column vector. Thus, the signal vector generation unit 24 generates baseband signal vector v composed of N signal elements $v_1$ to $v_N$ represented by the formula (3) (Step S10 of FIG. 3).

The DOA estimation portion 30 includes an arriving signal count predicting/setting unit 31 for predicting or setting the number of arriving signals, a Hankel matrix generation unit 32, and an estimation unit 45. The DOA estimation portion 30 is operable to estimate DOA from the baseband signals. The estimation unit 45 includes a propagator matrix generation unit 33, a core matrix generation unit 34, and a DOA computation unit 35. The DOA estimation portion 30 may be implemented by an arithmetical unit such as a central processing unit (CPU) in a computer, a program executed by such an arithmetical unit, or an entity on a storage device in a computer. Furthermore, the entire structure of the receiving portion 20 and the DOA estimation portion 30 may be implemented by an arithmetical unit in terms of a software radio device.

The arriving signal count predicting/setting unit 31 is operable to predict or set the number of arriving signals M (Step S12 of FIG. 3). Akaike's information criteria (AIC), minimum description length (MDL), or other appropriate indexes based on a maximum likelihood method can be used to predict the number of arriving signals M. In a case where the arriving signal count predicting/setting unit 31 does not predict the number of arriving signals M, the value M may automatically be determined as [(N−1)/2] from the number of the antennas N. The symbol [x] gives a maximum natural number that is not more than a real number x.

The estimation unit 45 first determines whether or not an SN (signal-to-noise) ratio of the signal vector in the formula (3) is at least a predetermined threshold value (Step S14). If the SN ratio is lower than the threshold value, the estimation unit 45 computes a correlation vector $\text{conj}(v_N) \times [v_1, \ldots, v_N]^T$ where $\text{conj}(v_N)$ is a conjugate complex number of a signal $v_N$, for example, and redefines the signal vector as the computed correlation vector (Step S16).

The Hankel matrix generation unit 32 generates a Hankel matrix $R_{f1}$ as shown in the formula (20). If the signal vector has been redefined in Step S16, the Hankel matrix generation unit 32 generates a matrix having a structure (made up of previously mentioned correlation vectors) as shown in the formula (16), the case of which will not hereinafter be mentioned. The propagator matrix generation unit 33 defines a matrix $R=[R_{f1}]$ (Step S18).

The propagator matrix generation unit 33 decomposes the matrix R into two submatrices $R_1$ and $R_2$ and generates a matrix $\Gamma=(R_1R_1^H)^{-1}R_1R_2^H$ as described above. Furthermore, the propagator matrix generation unit 33 generates a propagator matrix $\Pi=[\Gamma|-I_{N-2M}]^T$ from the matrix $\Gamma$ and a unit matrix $I_{N-2M}$ (Step S22).

The core matrix generation unit 34 generates a core matrix $\Omega=\Pi(\Pi^H\Pi)^{-1}\Pi^H$ (Step S24).

The DOA computation unit 35 generates an angular spectrum $P(\theta)$ as shown in the formula (24) with use of an array mode vector $a(\theta)$, which includes the parameter $\theta$, defined by $a(\theta)=[1, \exp(j2\pi\alpha \sin\theta), \ldots, \exp(j2\pi\alpha(N-M-1)\sin\theta)]^T$ where $\alpha=d/\lambda$, and of the core matrix $\Omega$ (Step S26). The DOA computation unit 35 computes an angular spectrum $P(\theta)$ while scanning the parameter $\theta$. The DOA computation unit 35 computes an arrival angle $\theta_m$ of the arriving signal from the peak of the angular spectrum $P(\theta)$. Alternatively, the DOA computation unit 35 computes an arrival angle $\theta_m$ from a solution of an algebraic equation $(a(1/z)^T \Omega a(z)=0)$ where $z=\exp(j2\pi\alpha \sin(\theta))$ and $\alpha=d/\lambda$. The DOA computation unit 35 outputs the arrival angle $\theta_m$ as an estimated direction of arrival (Step S28).

Instead of the Hankel matrix $R_{f1}$, the Hankel matrix generation unit 32 may generate a Hankel matrix $R_{f2}$ as defined by $$R_{f2} = \begin{pmatrix} v_2 & \cdots & v_{M+1} \\ \vdots & & \vdots \\ v_{N-M+1} & \cdots & v_N \end{pmatrix} \quad (25)$$

The Hankel matrix $R_{f2}$ includes other elements $v_2$ to $v_N$ of the signal vector. Then the propagator matrix generation unit 33 may generate a propagator matrix $\Pi$ with use of this Hankel matrix $R_{f2}$.

Furthermore, instead of the Hankel matrix $R_{f1}$, the Hankel matrix generation unit 32 may generate a Hankel matrix $R_{b1}$ including complex conjugate elements $v_1^*$ to $v_{N-1}^*$ of the signal vector by $R_{b1}=J_{N-M}R_{f1}^*J_M$ where $R_{f1}^*$ is a matrix including a conjugate complex number of every element in $R_{f1}$. Then the propagator matrix generation unit 33 may generate a propagator matrix $\Pi$ with use of this Hankel matrix $R_{b1}$.

For example, in a case where N=5 and M=2, the Hankel matrix $R_{b1}$ is represented by $$R_{b1} = J_{N-M}R_{f1}^*J_M = \begin{pmatrix} 0 & 0 & 1 \\ 0 & 1 & 0 \\ 1 & 0 & 0 \end{pmatrix} \begin{pmatrix} v_1 & v_2 \\ v_2 & v_3 \\ v_3 & v_4 \end{pmatrix}^* \begin{pmatrix} 0 & 1 \\ 1 & 0 \end{pmatrix} = \begin{pmatrix} v_4^* & v_3^* \\ v_3^* & v_2^* \\ v_2^* & v_1^* \end{pmatrix} \quad (26)$$

Next, a matrix R is defined by $$R \equiv [R_{b1}] = \begin{pmatrix} v_4^* & v_3^* \\ v_3^* & v_2^* \\ v_2^* & v_1^* \end{pmatrix} \equiv \begin{pmatrix} R_1 \\ R_2 \end{pmatrix} = \begin{bmatrix} \begin{pmatrix} v_4^* & v_3^* \\ v_3^* & v_2^* \end{pmatrix} \\ (v_2^* \quad v_1^*) \end{bmatrix} \quad (27)$$

Furthermore, the matrix R is divided into an (N−2M)×M submatrix $R_1$ and an (N−2M)×M submatrix $R_2$.

If a matrix $\Gamma$ is defined as $\Gamma=(R_1R_1^H)^{-1}R_1R_2^H$ using the submatrices $R_1$ and $R_2$, then $$\begin{aligned}\Gamma &\equiv (R_1R_1^H)^{-1}R_1R_2^H \\ &= \left[\begin{pmatrix} v_4^* & v_3^* \\ v_3^* & v_2^* \end{pmatrix}\begin{pmatrix} v_4 & v_3 \\ v_3 & v_2 \end{pmatrix}\right]^{-1} \begin{pmatrix} v_4^* & v_3^* \\ v_3^* & v_2^* \end{pmatrix}\begin{pmatrix} v_2 \\ v_1 \end{pmatrix} \\ &= \begin{pmatrix} |v_4|^2+|v_3|^2 & v_4^*v_3+v_3^*v_2 \\ v_3^*v_4+v_2^*v_3 & |v_3|^2+|v_2|^2 \end{pmatrix}^{-1} \begin{pmatrix} v_4^*v_2 & v_3^*v_1 \\ v_3^*v_2 & v_2^*v_1 \end{pmatrix} \\ &= \frac{1}{|(v_3)^2-v_4^*v_2|^2}\begin{bmatrix} \cdots \\ \cdots \end{bmatrix}\end{aligned} \quad (28)$$

The matrix $\Gamma$ in the formula (28) does not include a factor such as $1/|v_5|^2$ in the formula (19) while it holds phase information to be used for DOA estimation, as with the matrix $\Gamma$ in the formula (23). Accordingly, computation of the matrix $\Gamma$ and the propagator matrix $\Pi$ can be performed at a high speed with high accuracy.

Furthermore, instead of the Hankel matrix $R_{f1}$, the Hankel matrix generation unit 32 may generate a Hankel matrix $R_{b2}$ using complex conjugate elements $v_2^*$ to $v_N^*$ of the signal vector by $R_{b2}=J_{N-M}R_{f2}^*J_M$ where $R_{f2}^*$ is a matrix including a conjugate complex number of every element in $R_{f2}$. Then the propagator matrix generation unit 33 may generate a propagator matrix $\Pi$ using this Hankel matrix $R_{b2}$.

The propagator matrix generation unit 33 may combine K Hankel matrices $R_{f1}$, $R_{f2}$, $R_{b1}$, or $R_{b2}$ having the order of (N−M)×M to form a matrix R having the order of (N−M)×(K×M). For example, in a case in which K=2, the matrix R may be defined as $R=[R_{f1}|R_{f2}]$, $R=[R_{b1}|R_{b2}]$, $R=[R_{f1}|R_{b2}]$, or $R=[R_{f2}|R_{b1}]$. In a case in which K=4, the matrix R may be defined as $R=[R_{f1}|R_{f2}|R_{b1}|R_{b2}]$. In these cases, the matrix R is divided into an M×(K×M) submatrix $R_1$ and an (N−2M)×(K×M) submatrix $R_2$ so that $R=[R_1|R_2]^T$.

As described above, the propagator matrix generation unit 33 uses at least one of the matrices $R_{f1}$, $R_{f2}$, $R_{b1}$, and $R_{b2}$ to generate a matrix R and divides the matrix R into two submatrices $R_1$ and $R_2$ having an appropriate order.

According to the direction-of-arrival estimation apparatus 100 in the first embodiment, the Hankel matrix generation unit 32 generates at least one of the matrices $R_{f1}$, $R_{f2}$, $R_{b1}$, and $R_{b2}$. The estimation unit 45 uses at least one of the matrices $R_{f1}$, $R_{f2}$, $R_{b1}$, and $R_{b2}$ to generate a matrix R and divides the matrix R into two submatrices $R_1$ and $R_2$ so that $R=[R_1|R_2]^T$. The estimation unit 45 uses those submatrices $R_1$ and $R_2$ to compute the matrices $\Gamma$, $\Pi$, and $\Omega$, thereby estimating a direction of the arriving signal. Thus, with use of the matrix $\Gamma$ (see the formula (23)) that does not include a factor such as $1/|v_5|^2$ in the formula (19), computation of the matrix $\Gamma$ and the propagator matrix $\Pi$ can be performed at a high speed with high accuracy.

Second Embodiment

Figure 4:
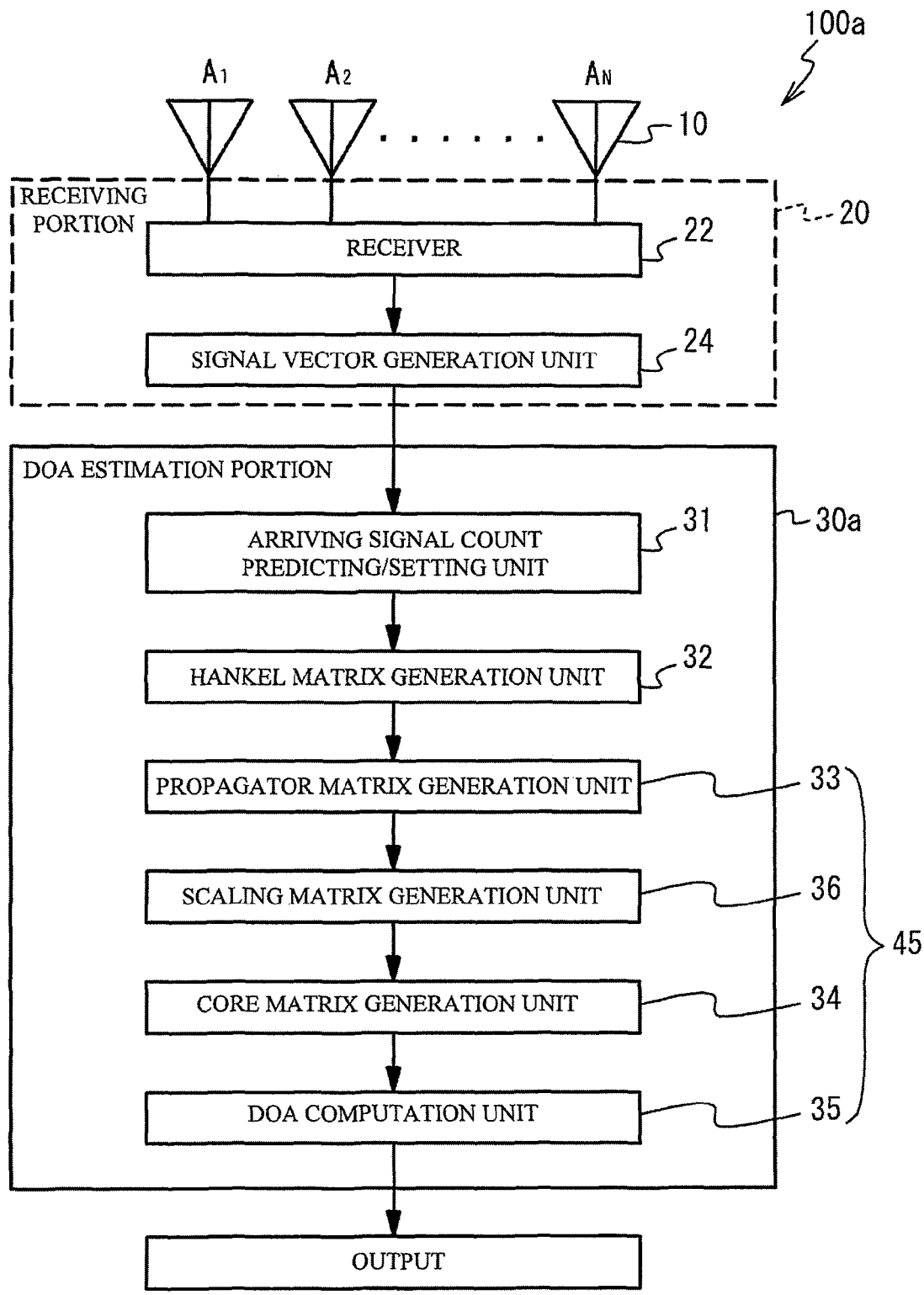
FIG. 4 is a block diagram showing a direction-of-arrival estimation apparatus according to a second embodiment of the present invention.

FIG. 4 is a block diagram showing a direction-of-arrival estimation apparatus according to a second embodiment of the present invention. As shown in FIG. 4, a direction-of-arrival estimation apparatus 100a differs from the direction-of-arrival estimation apparatus 100 shown in FIG. 2 of the first embodiment in that a DOA estimation portion 30a includes a scaling matrix generation unit 36. Other components shown in FIG. 4 are the same as those in FIG. 2 of the first embodiment and will not be described repetitively.

The scaling matrix generation unit 36 uses submatrices $R_1$ and $R_2$ of a matrix R which are generated by the propagator matrix generation unit 33 to generate an $(N-2M)\times(N-2M)$ scaling matrix $\Lambda$ defined by $\Lambda=R_2R_2^H-R_2R_1^H\Gamma$. The core matrix generation unit 34 generates a core matrix $\Omega$ defined by $\Omega=\Pi(\Lambda)^{-1}\Pi^H$ from the propagator matrix $\Pi$ and the scaling matrix $\Lambda$. Alternatively, the core matrix generation unit 34 may generate a core matrix $\Omega$ defined by $\Omega=\Pi'(\Lambda)^{-1}(\Pi')^H$ where $\Pi'=\Pi(\Pi^H\Pi)^{-1/2}$.

The core matrix generation unit 34 may generate a core matrix $\Omega$ defined by $\Omega=\Pi\Pi^H$ instead of $\Omega=\Pi(\Lambda)^{-1}\Pi^H$. In this case, the angular spectrum is defined by $$P(\theta) = \frac{a^H(\theta)a(\theta)}{a^H(\theta)[\Pi\Pi^H]a(\theta)} \quad (29)$$

The algebraic equation is defined by $$a(1/z)^T[\Pi\Pi^H]a(z)=0 \quad (30)$$

$$a(z)\equiv(1,z,\ldots,z^{N-2M-1})^T \quad (31)$$

where $z=\exp(j2\pi\alpha \sin(\theta))$ and $\alpha=d/\lambda$.

The core matrix generation unit 34 may generate a core matrix $\Omega$ defined by $\Omega=\Pi[\alpha(\Pi^H\Pi)+(1-\alpha)\Lambda]^{-1}\Pi^H$ where $0\leq\alpha\leq 1$ (of course, this linear combination parameter "$\alpha$" differs from the constant $d/\lambda$). Thus, the core matrix generation unit 34 may combine a plurality of matrices derived from a Hankel matrix to generate a core matrix.

Assuming that $\alpha\neq 0$ or 1 and that $\Pi^H\Pi$ and $\Lambda$ have no singularity, the core matrix $\Omega$ is given by $$\begin{aligned}\Omega &= \Pi[\alpha A + \beta B]^{-1}\Pi^H \quad (32)\\ &= \Pi\left[I+\frac{\beta}{\alpha}A^{-1}B\right]^{-1}(\alpha A)^{-1}\Pi^H\\ &= \Pi\left[I-\left(\frac{\beta}{\alpha}A^{-1}B\right)^{-1}\right](\alpha A)^{-1}\Pi^H\\ &= \frac{1}{\alpha}\Pi A^{-1}\Pi^H - \Pi\left(\frac{\alpha}{\beta}B^{-1}A\right)\frac{1}{\alpha}A^{-1}\Pi^H\\ &= \frac{1}{\alpha}\Pi(\Pi^H\Pi)^{-1}\Pi^H - \frac{1}{\beta}\Pi(\Lambda)^{-1}\Pi^H\end{aligned}$$

where $A=\Pi^H\Pi$, $B=\Lambda$, and $1-\alpha=\beta$.

Thus, this core matrix $\Omega$ is equal to a weighted average of known core matrices $\Pi(\Pi^H\Pi)^{-1}\Pi^H$ and $\Pi(\Lambda)^{-1}\Pi^H$. Accordingly, it is possible to perform an angle estimation for a target for which angle would be hard to estimate with sole use of the known core matrices.

While the core matrix generation unit 34 in the first embodiment generates a core matrix $\Omega$ from the propagator matrix $\Pi$, the core matrix generation unit 34 in the second embodiment generates a core matrix $\Omega$ from the propagator matrix $\Pi$ and the scaling matrix $\Lambda$. Then, by DOA estimation unit 35, a direction of arrival may be computed from the angular spectrum or the algebraic equation as with the first embodiment.

Furthermore, the core matrix generation unit 34 may generate a core matrix $\Omega$ by using the propagator matrix $\Pi$ and a substitute matrix which properly combines a matrix A defined by $A=R_1R_1^H$, a matrix B defined by $B=R_1R_2^H$, a matrix C defined by $C=R_2R_1^H$, and a matrix D defined by $D=R_2R_2^H$, such as D, $(B^HA^{-1}B)$, $(B^HB)$, $(D-B^HB)$, or $\Lambda(\Pi^H\Pi)$, instead of using the scaling matrix $\Lambda$.

For example, if the angular spectrum using the matrix D is defined by $$P(\theta) = \frac{a^H(\theta)a(\theta)}{a^H(\theta)[\Pi D^{-1}\Pi]a(\theta)} \quad (33)$$

The algebraic equation using the matrix D is defined by $$a(1/z)^T[\Pi D^{-1}\Pi^H]a(z)=0 \quad (34)$$

$$a(z)\equiv(1,z,\ldots,z^{N-M-1})^T \quad (35)$$

where $z=\exp(j2\pi\alpha \sin(\theta))$ and $\alpha=d/\lambda$.

And, the DOA computation unit 35 may compute a direction of arrival by using the the substitute matrix for the scaling matrix $\Lambda$.

FIGS. 5A to 8 show examples in which the second embodiment was applied to a frequency modulated continuous wave (FMCW) radar to orient a target. In these figures, the unit of distance is bin.

FIGS. 5A to 5D are diagrams showing angular spectra with respect to angles and distances in a case where two targets were located. The targets were set at a distance of 40 m and an angle of 0° and 3°, respectively. FIG. 5A shows an angular spectrum computed by using an FFT-DBF method, FIG. 5B by using an FBSS-MUSIC method, FIG. 5C by using a method disclosed in Patent Document 1 (Comparative Example), and FIG. 5D by using a method according to the second embodiment. In these figures, if the angular spectrum is intensive at locations of the two assumed targets, i.e., if clear points are seen near the two targets in an angular spectrum, then the angular spectrum shows that directions of arrival are estimated for those targets with high accuracy.

Figure 6:
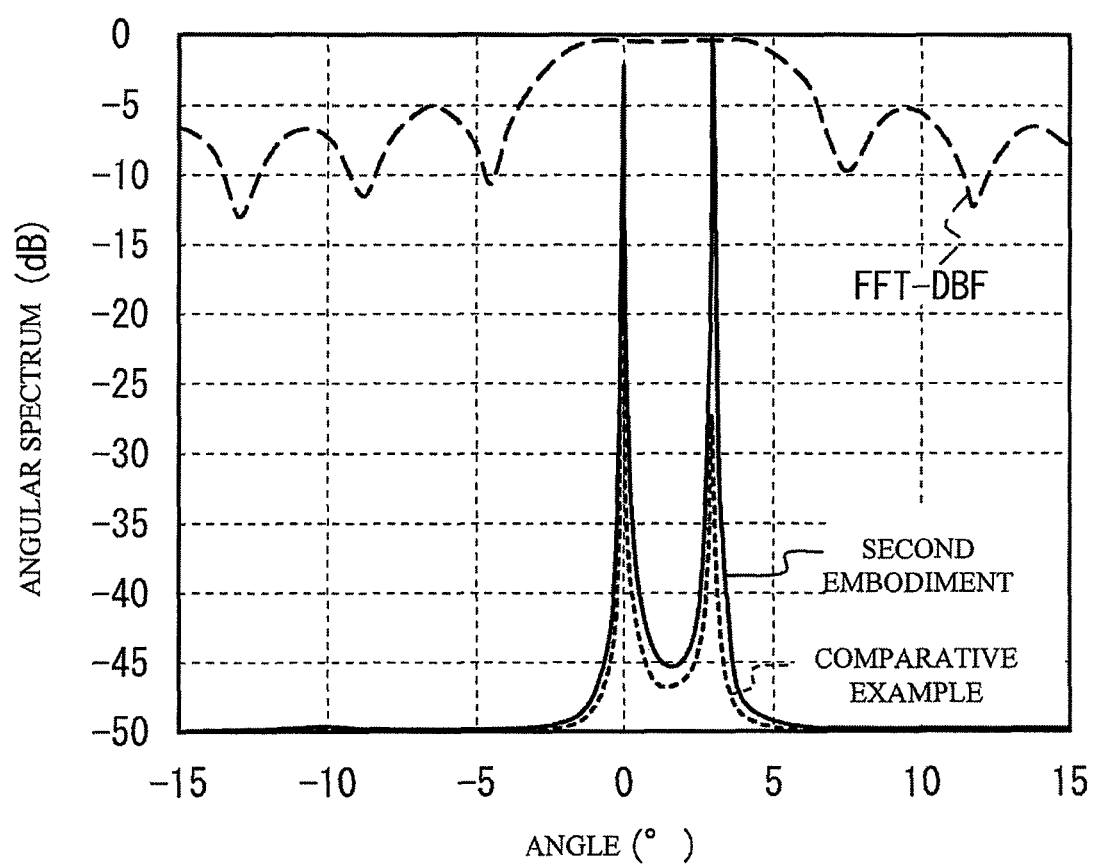
FIG. 6 is a diagram showing an angular spectrum at a constant distance with respect to angles.

FIG. 6 is a graph superposing the angular spectra shown in FIGS. 5A, 5C, and 5D that were cut in parallel to the angle axis at a distance of 40 m. It can be seen from FIGS. 5A to 6 that the method of Comparative Example (Patent Document 1) and the method of the second embodiment each performed angle estimation for the targets with higher accuracy as compared to the FFT-DBF method and the FBSS-MUSIC method.

Figure 7:
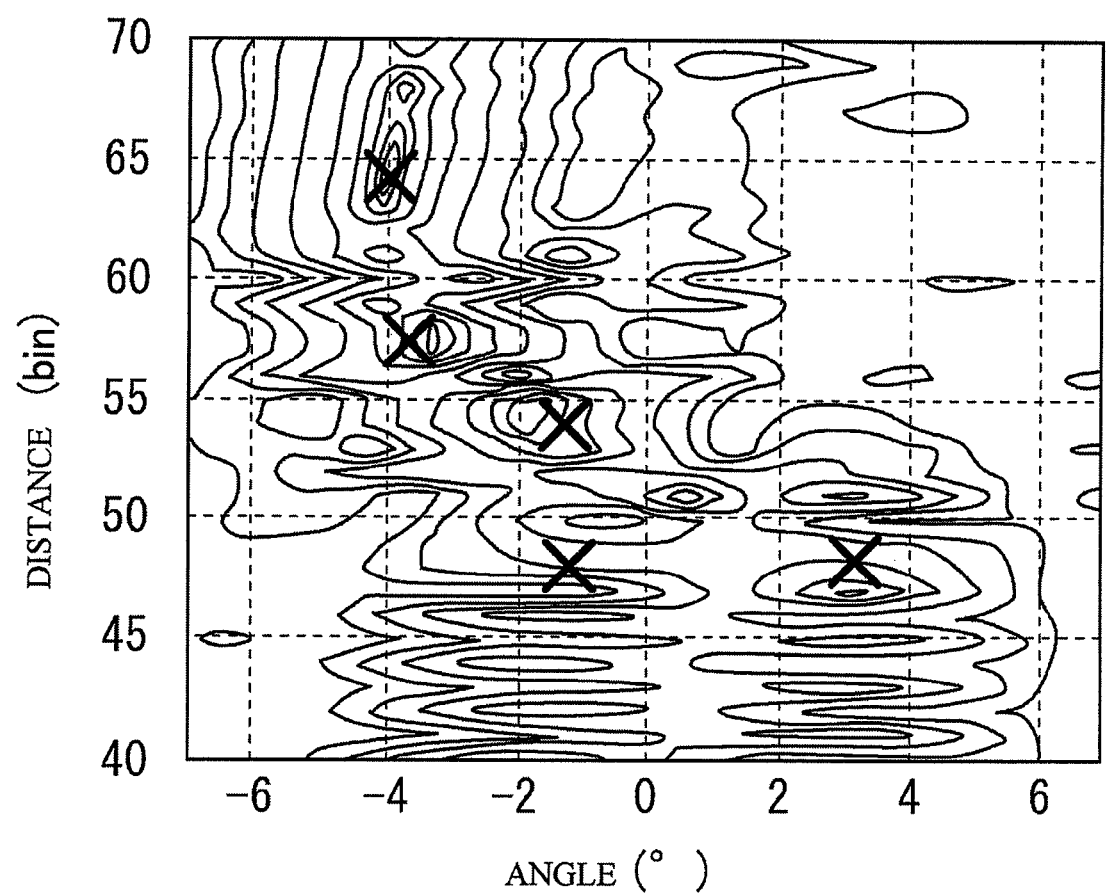
FIG. 7 is a diagram showing an angular spectrum in a comparative example.
Figure 8:
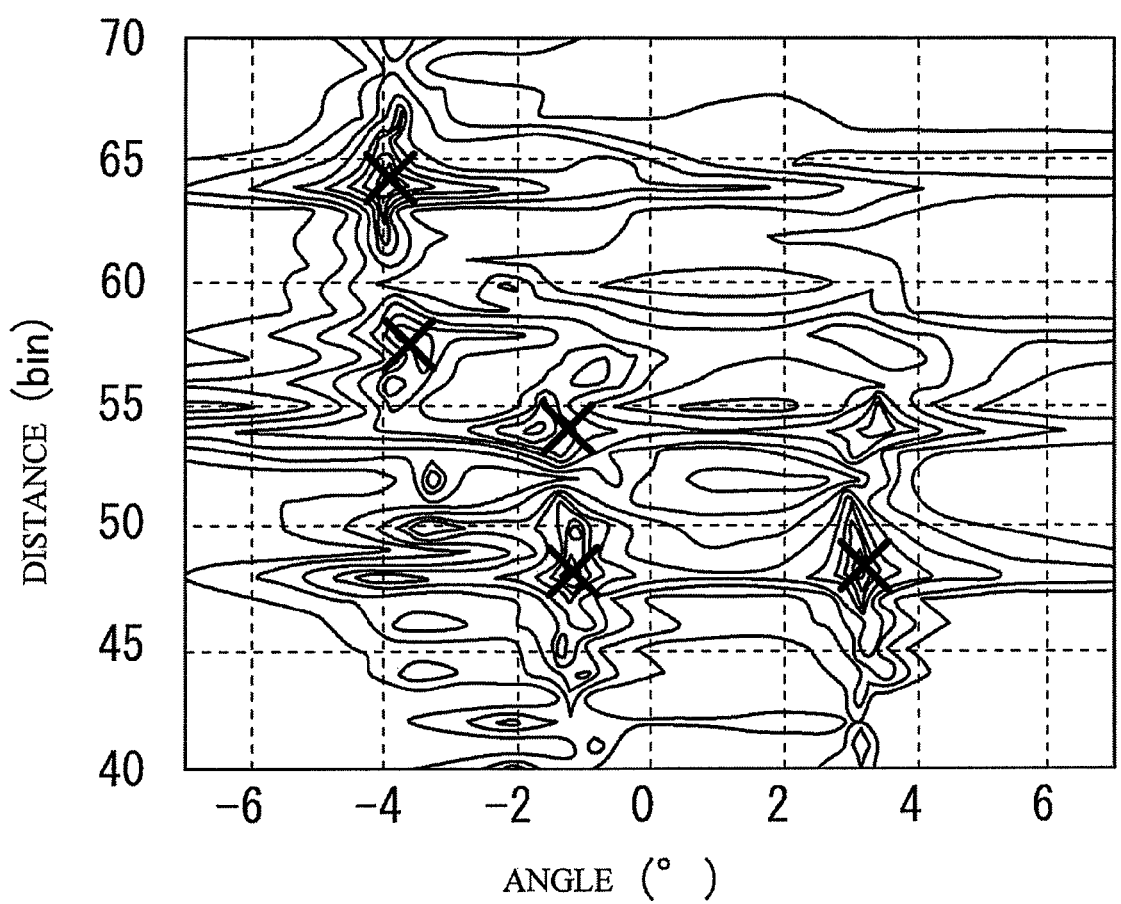
FIG. 8 is a diagram showing an angular spectrum in the second embodiment of the present invention.

FIGS. 7 and 8 are examples in which the orientation performance for a plurality of targets arranged at spatially proximate locations was evaluated by the angular spectra on the assumption of five targets, which are indicated at the cross-marked points in the figures. The peaks of the angular spectrum are located at areas in which contours are intensively illustrated. Since those figures are illustrated in monochrome, it may slightly be difficult to see those peaks. FIG. 7 shows the angular spectrum computed by using the method disclosed in Patent Document 1. FIG. 8 shows the angular spectrum computed by using a core matrix defined by $\Omega=\Pi[\alpha(\Pi)+(1-\alpha)\Lambda]^{-1}\Pi^H$ where $\alpha=0.5$ in the second embodiment. In FIG. 8, contours are more intensive near the cross-marked points as compared to FIG. 7. Thus, the peaks of the angular spectrum are located near the assumed targets. By using a combined core matrix, it is possible to accurately detect many targets which produce echo signals having high coherence and would thus be hard to estimate.

Third Embodiment

An example of a direction-of-arrival estimation apparatus mounted on a vehicle such as an automobile will be described in a third embodiment of the present invention. In the third embodiment, a direction-of-arrival estimation apparatus 100b is configured to output an angle (an angle of arrival) for a target that may threaten a vehicle having millimeter-wave radar with the direction-of-arrival estimation apparatus 100b. For example, a vehicle such as an automobile traveling ahead of the vehicle on which the direction-of-arrival estimation apparatus 100b is mounted may be a target.

Figure 9:
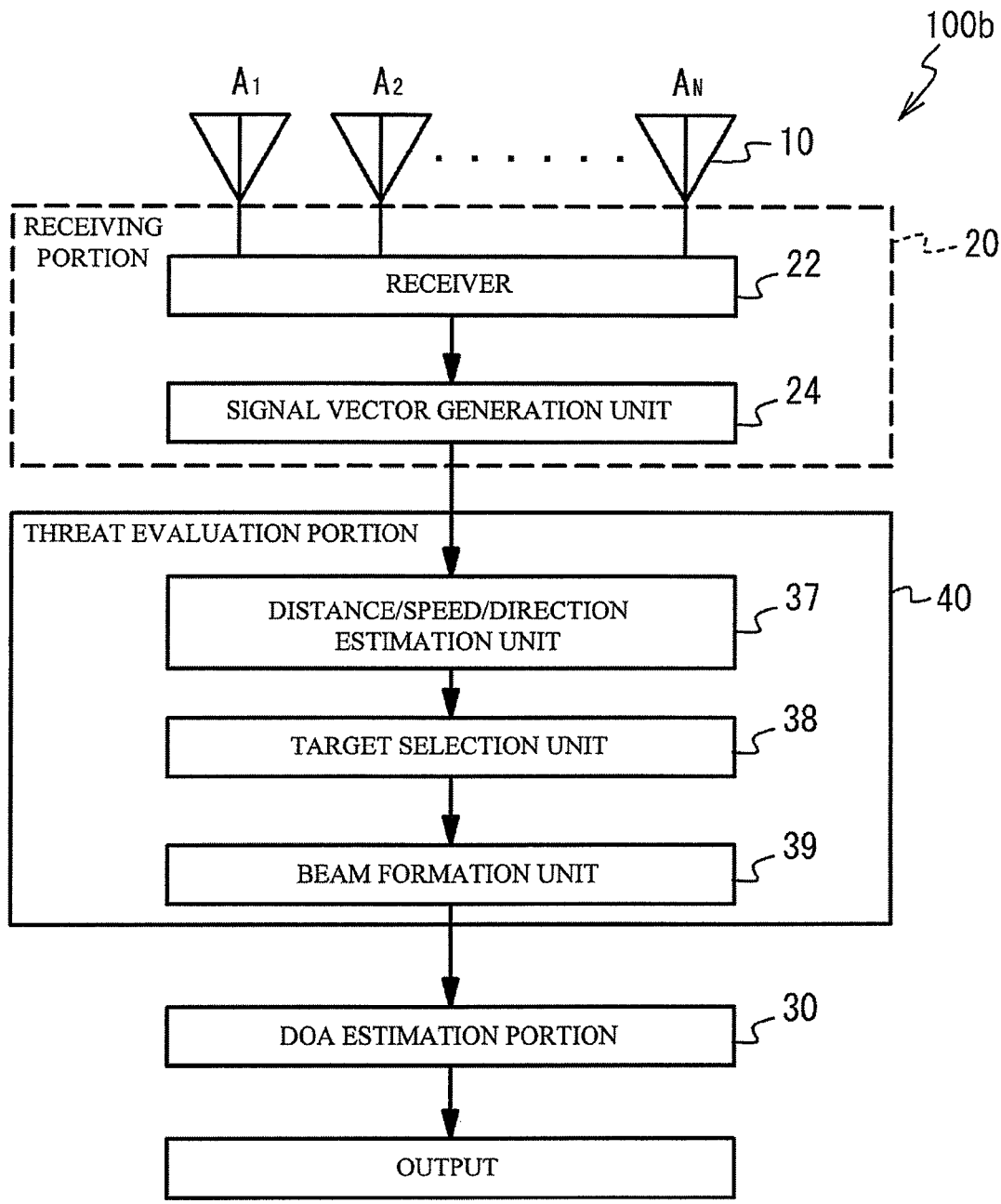
FIG. 9 is a block diagram showing a direction-of-arrival estimation apparatus according to a third embodiment of the present invention.

FIG. 9 is a block diagram showing the direction-of-arrival estimation apparatus 100b according to the third embodiment of the present invention. The direction-of-arrival estimation apparatus 100b includes a threat evaluation portion 40 provided between a receiving portion 20 and a DOA estimation portion 30. The threat evaluation portion 40 includes a distance/speed/direction estimation unit 37, a target selection unit 38, and a beam formation unit 39.

Figure 10:
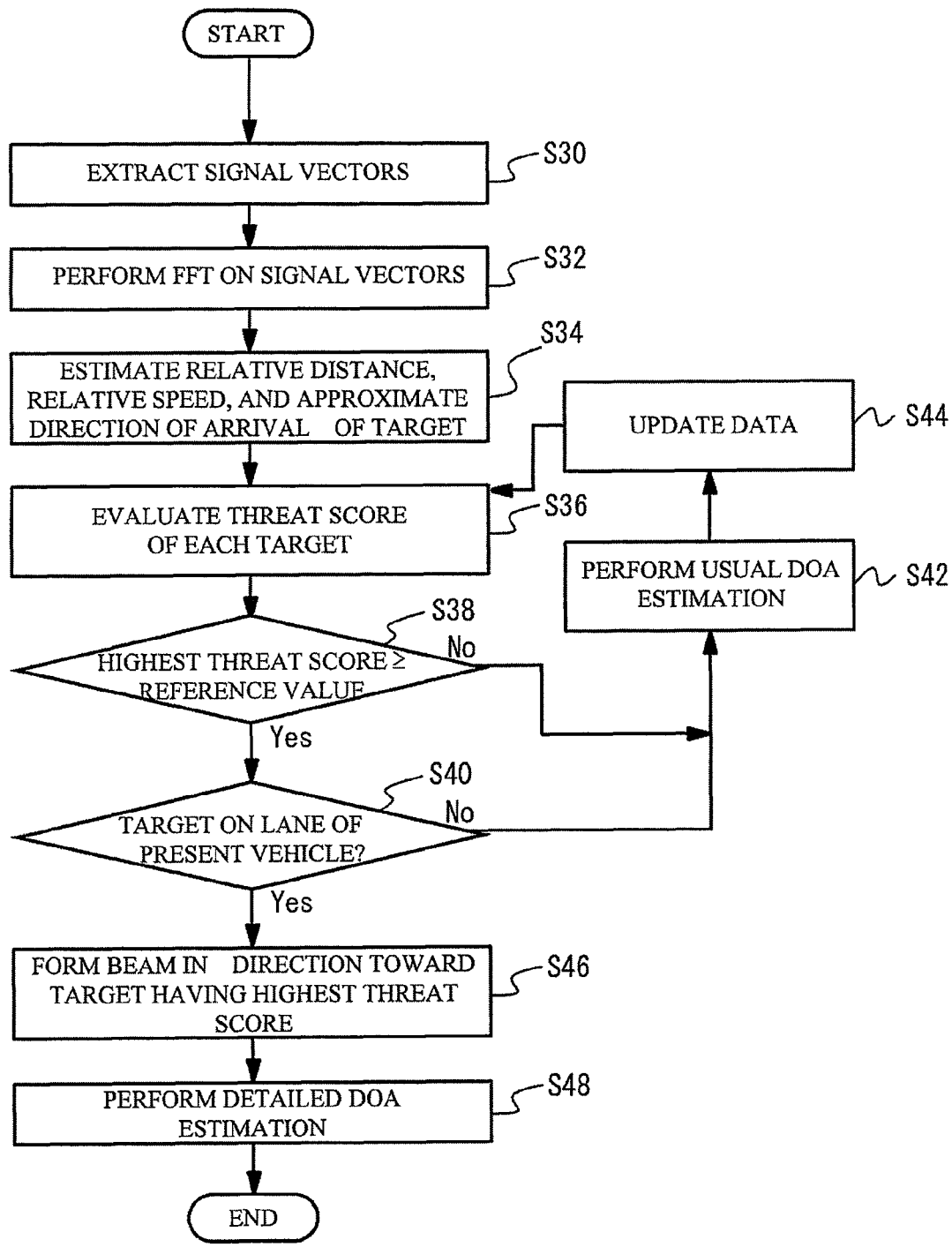
FIG. 10 is a flow chart showing processes performed in the direction-of-arrival estimation apparatus according to the third embodiment of the present invention.

FIG. 10 is a flow chart showing processes performed in the direction-of-arrival estimation apparatus 100b according to the third embodiment. The third embodiment will be described with reference to FIG. 10. For example, for each of the receiving antennas, sampling is conducted on echo signals during one cycle of a signal used for performing FM modulation on millimeter-wave signals. The signal vector generation unit 24 extracts data sets of signal vectors corresponding to each antenna (Step S30). Specifically, the data include an N×Q matrix (data set) where N is the number of the antennas and Q is the number of the samples. The distance/speed/direction estimation unit 37 performs fast Fourier transform (FFT) on the data set for each antenna in which Q-order vectors are arranged in N sets along the time domain (Step S32). The distance/speed/direction estimation unit 37 performs FFT on a Q-order vector N times to generate an N×Q matrix in which the data set has been converted into a data set in the frequency domain. The distance/speed/direction estimation unit 37 estimates a relative distance $r_m$ and a relative speed $s_m$ between each target and the present vehicle from a bin position corresponding to a peak that can be seen in the frequency domain as a result of the FFT. The bin position may be considered as a value of a frequency index. Furthermore, the distance/speed/direction estimation unit 37 extracts an N-order data vector at each target (bin) position and performs, for example, FFT-DBF (digital beam forming based on the maximum ratio combining approach) to roughly estimate an angular position of each target (Step S34). Moreover, the distance/speed/direction estimation unit 37 conducts pairing on the estimated relative distance, relative speed, and angular position as identification information specific to each target.

The target selection unit 38 evaluates a threat score of each target based on the relative distance $r_m$ and the relative speed $s_m$ of each target (Step S36). The threat score increases when the relative distance $r_m$ has a smaller value and the relative speed $s_m$ is negative and has a larger absolute value. In other words, the threat score increases when the target is approaching the present vehicle from its vicinity at a high speed. For example, the threat score employs an evaluation function defined by $$e(r_m, v_m) \equiv \frac{f(r_m, v_m)}{\sum_{k=1}^{M} f(r_k, v_k)} \quad (36)$$

where $$f(r_m, v_m) \equiv \frac{\exp(-s_m/s_{REF})}{(r_m/r_{REF})} \quad (37)$$

In the above evaluation function, $s_{REF}$ and $r_{REF}$ are predetermined in accordance with safety standards of a vehicle manufacturer or the like. For example, $s_{REF}$ and $r_{REF}$ may be varied dynamically according to the traffic situation obtained by information from an infrastructure system such as dedicated short range communications (DSRC).

The target selection unit 38 determines whether or not the highest threat score of the targets is at least a reference (threshold) value (Step S38). If the maximum threat score of the targets is at least the reference value, then the target selection unit 38 determines whether or not the target having the highest threat score is to intersect a traveling path of the present vehicle, such as a lane of the present vehicle, with reference to the angle of the target which has previously been estimated by the distance/speed/direction estimation unit 37 (Step S40).

If it is determined in Step S38 that the highest threat score of the targets is lower than the reference value, or if it is determined in Step S40 that the target having the highest threat score is not to intersect the traveling path of the present vehicle, then the threat score estimation unit 40 transfers the data (bin) of the relative distance $r_m$ and the relative speed $s_m$ of each target orientated on the frequency axis to the subsequent DOA estimation portion 30. The DOA estimation portion 30 applies a standard DOA estimation process having relatively low accuracy but requiring a small amount of computation, such as digital beam forming, to the N-order data vector for each specified bin position, thereby estimating an angle of each target (Step S42). As a matter of course, the DOA estimation portion 30 may use the DOA values estimated by the distance/speed/direction estimation unit 37 or by the method according to the first or second embodiment of the present invention. The DOA estimation portion 30 stores the identification information for each target which includes the relative distance, the relative speed, and the estimated angle, and updates the data previously stored in the last measurement (Step S44). The threat evaluation portion 40 uses the updated data as dynamic reference values to reevaluate a threat score of each target based on data to be obtained in the next measurement.

If it is determined in Step S40 that the target having the highest threat score is to intersect the traveling path of the present vehicle, then the target selection unit 38 extracts a corresponding N-order data vector, based on the data (bin) of the relative distance $r_m$ and the relative speed $s_m$ of the target that has been determined to have the highest threat score, and transfers the N-order data vector to the beam formation unit 39. The beam formation unit 39 refers to the angle information (roughly estimated by the distance/speed/direction estimation unit 37) of the target having the highest threat score and performs beam formation in a direction toward the target (Step S46). Thus, the threat score estimation portion 40 converts a data vector relating to a target having a high threat score into a beam space data and transfers it to the subsequent DOA estimation portion 30. The DOA estimation portion 30 estimates a direction of arrival by the method according to the first or second embodiment of the present invention, which can achieve detailed estimation of DOA (Step S48). When the apparatus starts new data measurement, then the same processes are repeated from Step S30.

The threat evaluation portion 40 according to the third embodiment uses signal vectors to evaluate a threat score indicative of a target's threat to the present vehicle. Based on the threat score, the estimation unit 45 of the DOA estimation portion 30 determines whether to estimate a direction of arrival for the target. Thus, by providing the threat evaluation portion 40 in the third embodiment, the importance of a target as to safety to the present vehicle can be evaluated by an index of a threat score. Depending upon the threat score of each target, an appropriate DOA estimation method can be applied in conjunction with the DOA estimation portion 30. Accordingly, a response time of the apparatus can be optimized.

Fourth Embodiment

Figure 11:
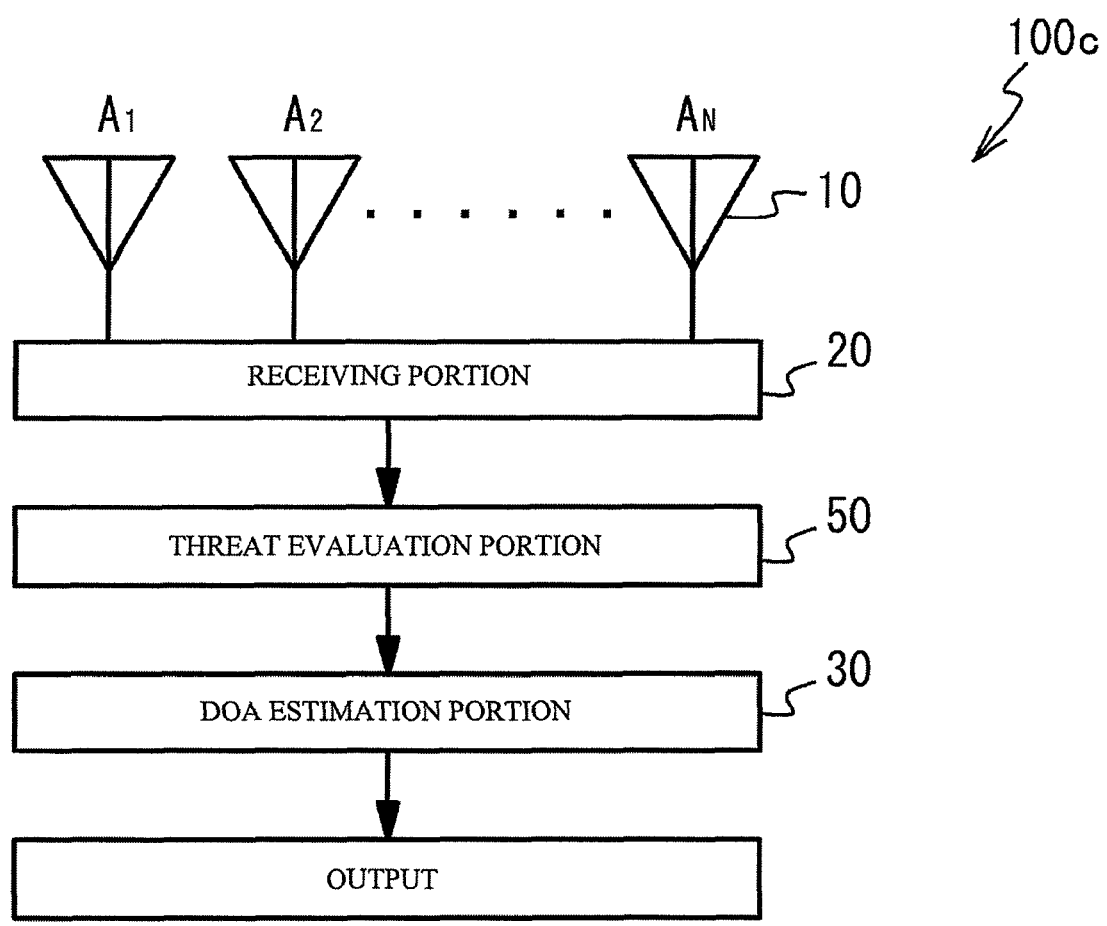
FIG. 11 is a block diagram showing a direction-of-arrival estimation apparatus according to a fourth embodiment of the present invention.

An apparatus according to a fourth embodiment of the present invention uses an additional index such as signal quality or a relative separation angle between targets, thereby achieving processes suitable for more practical use. FIG. 11 is a block diagram showing a direction-of-arrival estimation apparatus 100c according to the fourth embodiment of the present invention. In FIG. 11, the direction-of-arrival estimation apparatus 100c includes a threat evaluation portion 50 provided between a receiving portion 20 and a DOA estimation portion 30. The basic hardware configuration of the direction-of-arrival estimation apparatus 100c is substantially the same as that in the third embodiment and will not be described repetitively.

Figure 12:
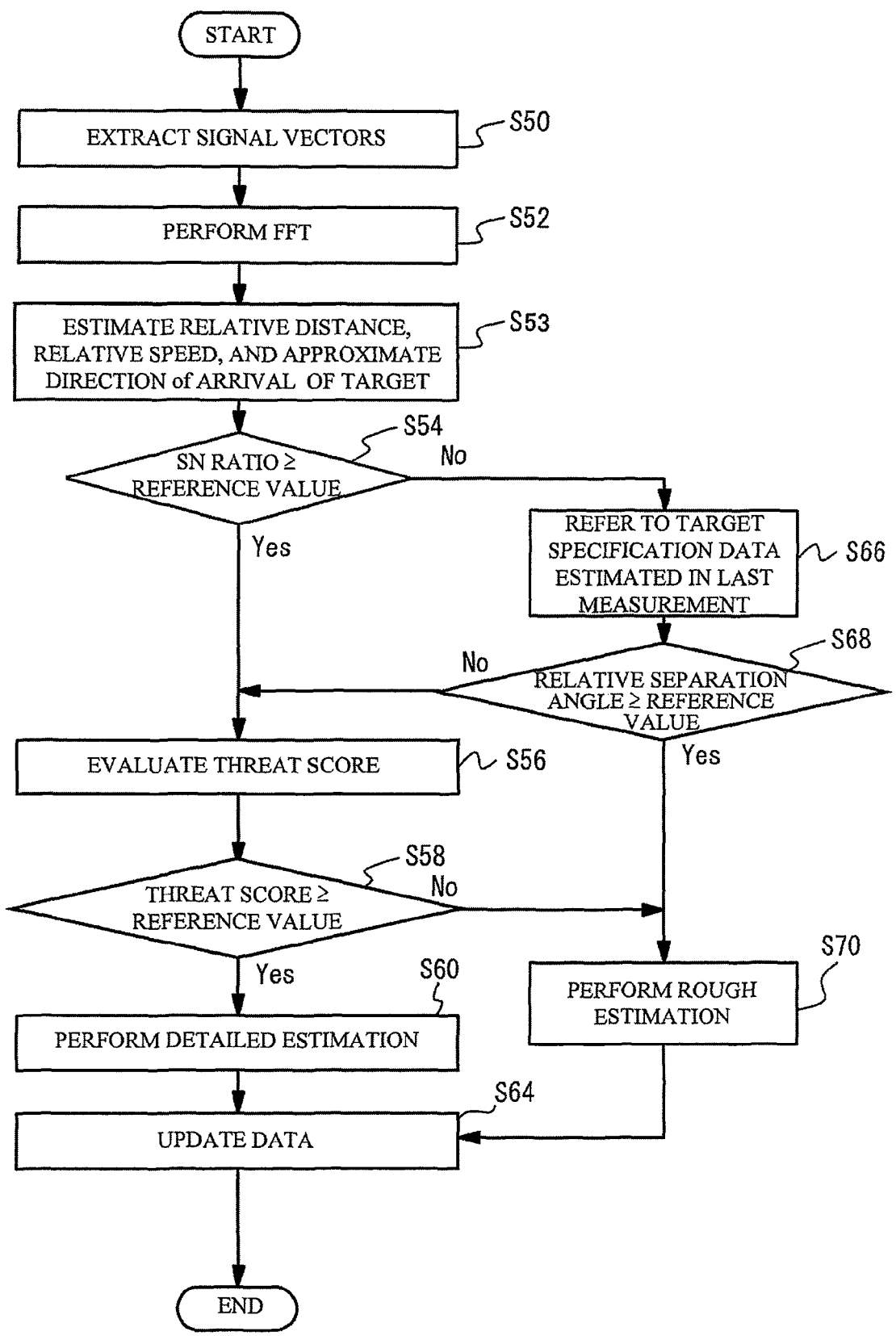
FIG. 12 is a flow chart showing processes performed in the direction-of-arrival estimation apparatus according to the fourth embodiment of the present invention.

FIG. 12 is a flow chart showing processes performed in the direction-of-arrival estimation apparatus 100c. The threat evaluation portion 50 is operable to perform the same processes from extraction of signal vectors (Step S50) to estimation of a relative distance and a relative speed for each target (Step S53) as those in the third embodiment. In this case, the rough DOA estimation using FFT-DBF or the like in the third embodiment may not necessarily be performed.

For functions of the threat evaluation portion 50, new steps are added to the preceding stage of the evaluation of a threat score (Step S56). The new steps include evaluation of signal quality (Step S54), reference to target specification data estimated in the last measurement (Step S66), and comparison of a relative separation angle referred to in Step S66 with a reference value (Step S68).

Newly added processes will be described. First, it is determined in Step S54 whether or not an SN ratio of a signal vector is at least a reference (threshold) value. If the SN ratio is at least the reference value, then the process proceeds to Step S56. If the SN ratio is lower than the reference value, then the process proceed to Step S66. In Step S66, data on a direction of arrival are extracted from target specification data estimated in the last measurement. Then, in Step 68, a relative separation angle of the extracted value is compared with a reference (threshold) value. If it is determined in Step S54 that the SN ratio is at least the reference value, or if it is determined in Step 68 that the relative separation angle is smaller than the reference value, then the threat evaluation portion 50 evaluates a threat score of each target (Step S56) and determines whether or not the highest threat score of the targets is at least a reference (threshold) value (Step S58). The evaluation of the threat score can be performed in the same manner as in Step S36 of the third embodiment.

If it is determined in Step S58 that the highest threat score of the targets is at least the reference value, then the control is transferred from the threat evaluation portion 50 to the DOA estimation portion 30, which performs detailed DOA estimation (Step S60). If it is determined in Step S58 that the highest threat score of the targets is lower than the reference value, or if it is determined in Step S68 that the relative separation angle is at least the reference value, then the control is transferred from the threat evaluation portion 50 to the DOA estimation portion 30, which performs rough DOA estimation (Step S70). Thus, the threat evaluation portion 50 uses signal vectors to evaluate an SN ratio, a relative separation angle, or a threat score indicative of a target's threat to the present vehicle. Depending upon these indexes of each target, the DOA estimation portion 30 can hire an estimation method having appropriate angle resolution for an individual target.

The differences between the process performed in Step S60 and the process performed in Step S70 will be described. If the theorem of an inverse matrix is applied to $RR^H$, then $$(RR^H)^{-1} = \begin{bmatrix} A & B \\ B^H & D \end{bmatrix}^{-1} \qquad (38)$$

$$= \begin{bmatrix} A^{-1} + A^{-1}B(D - B^H A^{-1} B)^{-1}(A^{-1}B)^H & -A^{-1}B(D - B^H A^{-1} B)^{-1} \\ (D - B^H A^{-1} B)^{-1}(A^{-1}B)^H & (D - B^H A^{-1} B)^{-1} \end{bmatrix}$$

$$= \begin{bmatrix} A^{-1} & 0 \\ 0 & 0 \end{bmatrix} +$$

$$\begin{bmatrix} A^{-1}B(D - B^H A^{-1} B)^{-1}(A^{-1}B)^H & A^{-1}B(D - B^H A^{-1} B)^{-1}(-I)^H \\ I(D - B^H A^{-1} B)^{-1}(A^{-1}B)^H & I(D - B^H A^{-1} B)^{-1}(-I)^H \end{bmatrix}$$

$$= \begin{bmatrix} A^{-1} & 0 \\ 0 & 0 \end{bmatrix} +$$

$$\begin{bmatrix} A^{-1}B \\ -I \end{bmatrix} (D - B^H A^{-1} B)^{-1} \left[ (A^{-1}B)^H (-I)^H \right]$$

$$= \begin{bmatrix} A^{-1} & 0 \\ 0 & 0 \end{bmatrix} + \Pi \Lambda^{-1} \Pi^H$$

where $R_1$ and $R_2$ are submatrices of the matrix R, $R_1 R_1^H = A$, $R_1 R_2^H = B$, $R_2 R_1^H = B^H$, and $D = R_2 R_2^H = D$.

From the formula (38), a core matrix $\Omega$ is given by $$\Omega = \Pi \Lambda^{-1} \Pi^H = (RR^H)^{-1} - \begin{pmatrix} (R_1 R_1^H)^{-1} & 0 \\ 0 & 0 \end{pmatrix} \qquad (39)$$

Estimation of a direction of arrival is performed in Step S60 by using a core matrix $\Omega$ defined by $\Omega = (RR^H)^{-1} - [(R_1 R_1^H)^{-1} | 0_{M \times (N-2M)}; \; 0_{(N-2M) \times M} | 0_{N-2M}]$. Estimation of a direction of arrival is performed in Step S70 by using a core matrix $\Omega$ defined by $\Omega = (RR^H)^{-1}$. Since the matrix used in Step S70 includes components spanning a signal subspace, the estimation accuracy becomes low. However, $(R_1 R_1^H)^{-1}$ can be computed relatively readily in the process for computing the matrix of Step S70. Therefore, the method according to the fourth embodiment can facilitate switching of the estimation accuracy.

As described above, according to the fourth embodiment of the present invention, detailed DOA estimation is performed in Step S60 if the quality (SN ratio) of an echo signal is at least a reference value and the threat score of the target is at least a reference value. Rough DOA estimation is performed as in Step S70 if the threat score of the target is so low that the detail of a position of the target is not required to be obtained, or if the SN ratio of the echo signal is so low that accurate estimation cannot be expected even with a high-loaded computation. In other words, the apparatus according to the fourth embodiment can select an appropriate operation—an operation for quick response or an operation for high accuracy—depending upon its practical use.

Although the preferred embodiments of the present invention has been shown and described in detail, the present invention is not limited to those embodiments. It would be apparent to those skilled in the art that many modifications and variations may be made within the scope of the appended claims of the present invention.

The invention claimed is:

1. A direction-of-arrival estimation apparatus comprising:
   N sensors;
   a signal vector generation unit generating a signal vector v composed of N baseband signals $v_1$ to $v_N$ from arriving signals received from a target by the N sensors, the target transmitting the signals or reflecting the signals;
   a Hankel matrix generation unit setting an order of a column of a matrix at a natural number M where $1 \leq M$ and $M \leq (N-1)/2$ and generating at least one of (N−M)×M matrices $R_{f1}$, $R_{f2}$, $R_{b1}$, and $R_{b2}$ from elements $v_1$ to $v_{N-1}$ or $v_2$ to $v_N$ of the signal vector, the matrix $R_{f1}$ being an (N−M)×M Hankel matrix including elements $v_1$ to $v_{N-1}$ of the signal vector and being defined by $$R_{f1} = \begin{pmatrix} v_1 & \cdots & v_M \\ \vdots & & \vdots \\ v_{N-M} & \cdots & v_{N1} \end{pmatrix}$$

the matrix $R_{f2}$ being an (N−M)×M Hankel matrix including elements $v_2$ to $v_N$ of the signal vector and being defined by $$R_{f2} = \begin{pmatrix} v_2 & \cdots & v_{M|1} \\ \vdots & & \vdots \\ v_{N-M+1} & \cdots & v_N \end{pmatrix}$$

the matrix $R_{b1}$ being an (N−M)×M Hankel matrix including complex conjugate elements $v_1^*$ to $v_{N-1}^*$ of the signal vector and being defined by $R_{b1}=J_{N-M}R_{f1}^*J_M$ where $J_{N-M}$ is an (N−M)×(N−M) anti-diagonal unit matrix and $J_M$ is an M×M anti-diagonal unit matrix, the matrix $R_{b2}$ being an (N−M)×M Hankel matrix including complex conjugate elements $v_2^*$ to $v_N^*$ of the signal vector and being defined by $R_{b2}=J_{N-M}R_{f2}^*J_M$ where $J_{N-M}$ is an (N−M)×(N−M) anti-diagonal unit matrix and $J_M$ is an M×M anti-diagonal unit matrix; and
   an estimation unit generating a matrix R using at least one of the matrices $R_{f1}$, $R_{f2}$, $R_{b1}$, and $R_{b2}$, dividing the matrix R into two submatrices $R_1$ and $R_2$ by $R=[R_1|R_2]^T$, and estimating a direction of arrival of the arriving signal based on the submatrices $R_1$ and $R_2$.

2. The direction-of-arrival estimation apparatus as recited in claim 1, wherein the estimation unit generates a propagator matrix Π defined by $\Pi=[\Gamma|-I_{N-2M}]^T$ or a propagator matrix Π' defined by $\Pi'=\Pi(\Pi^H\Pi)^{-1/2}$ where the matrix Γ is defined by $\Gamma=(R_1R_1^H)^{-1}R_1R_2^H$ and $I_{N-2M}$ is an (N−2M)×(N−2M) unit matrix, and estimates the direction of arrival from the propagator matrix Π or Π'.

3. The direction-of-arrival estimation apparatus as recited in claim 2, wherein the estimation unit generates a core matrix Ω defined by $\Omega=\Pi(\Pi^H\Pi)^{-1}\Pi^H$ or $\Omega=\Pi'(\Pi'^H\Pi')^{-1}\Pi'^H$ using the propagator matrix Π or Π' and estimates the direction of arrival from the core matrix Ω.

4. The direction-of-arrival estimation apparatus as recited in claim 3, wherein the estimation unit combines a plurality of core matrices and estimates the direction of arrival from the combined core matrices.

5. The direction-of-arrival estimation apparatus as recited in claim 2, wherein the estimation unit generates a scaling matrix Λ defined by $\Lambda=R_2R_2^H-R_2R_1^H\Gamma$ and estimates the direction of arrival from the propagator matrix Π or Π' or the scaling matrix Λ.

6. The direction-of-arrival estimation apparatus as recited in claim 5, wherein the estimation unit generates a core matrix Ω defined by $\Omega=\Pi(\Lambda)^{-1}\Pi^H$ or $\Omega=\Pi'(\Lambda)^{-1}\Pi'^H$ from the propagator matrix Π or Π' and the scaling matrix Λ and estimates the direction of arrival from the core matrix Ω.

7. The direction-of-arrival estimation apparatus as recited in claim 6, wherein the estimation unit combines a plurality of core matrices and estimates the direction of arrival from the combined core matrices.

8. The direction-of-arrival estimation apparatus as recited in claim 1, further comprising a threat evaluation portion evaluating, with use of the signal vectors, a threat score indicative of a threat of the target to a vehicle on which the direction-of-arrival estimation apparatus is mounted,
   wherein the estimation unit determines, based on the threat score, whether to estimate the direction of arrival for the target.

9. The direction-of-arrival estimation apparatus as recited in claim 1, further comprising a threat evaluation portion evaluating, with use of the signal vectors, a threat score indicative of a threat of the target to a vehicle on which the direction-of-arrival estimation apparatus is mounted,
   wherein the estimation unit determines an angle resolution to be applied to the estimation of the direction of arrival for the target.

10. A direction-of-arrival estimation method that is performed by a direction-of-arrival estimation apparatus including N sensors comprising:
   generating a signal vector v composed of N baseband signals $v_1$ to $v_N$ from arriving signals received from a target by the N sensors, the target transmitting the signals or reflecting the signals;
   setting an order of a column of a matrix at a natural number M where $1 \leq M$ and $M \leq (N-1)/2$;
   generating at least one of (N−M)×M matrices $R_{f1}$, $R_{f2}$, $R_{b1}$, and $R_{b2}$ from elements $v_1$ to $v_{N-1}$ or $v_2$ to $v_N$ of the signal vector, the matrix $R_{f1}$ being an (N−M)×M Hankel matrix including elements $v_1$ to $v_{N-1}$ of the signal vector and being defined by $$R_{f1} = \begin{pmatrix} v_1 & \cdots & v_M \\ \vdots & & \vdots \\ v_{N-M} & \cdots & v_{N1} \end{pmatrix}$$

the matrix $R_{f2}$ being an (N−M)×M Hankel matrix including elements $v_2$ to $v_N$ of the signal vector and being defined by $$R_{f2} = \begin{pmatrix} v_2 & \cdots & v_{M+1} \\ \vdots & & \vdots \\ v_{N-M+1} & \cdots & v_N \end{pmatrix}$$

the matrix $R_{b1}$ being an (N−M)×M Hankel matrix including complex conjugate elements $v_1^*$ to $v_{N-1}^*$ of the signal vector and being defined by $R_{b1} = J_{N-M} R_{f1}^* J_M$ where $J_{N-M}$ is an (N−M)×(N−M) anti-diagonal unit matrix and $J_M$ is an M×M anti-diagonal unit matrix, the matrix $R_{b2}$ being an (N−M)×M Hankel matrix including complex conjugate elements $v_2^*$ to $v_N^*$ of the signal vector and being defined by $R_{b2} = J_{N-M} R_{f2}^* J_M$ where $J_{N-M}$ is an (N−M)×(N−M) anti-diagonal unit matrix and $J_M$ is an M×M anti-diagonal unit matrix;

generating a matrix R using of at least one of the matrices $R_{f1}$, $R_{f2}$, $R_{b1}$, and $R_{b2}$;

dividing the matrix R into two submatrices $R_1$ and $R_2$ by $R = [R_1 | R_2]^T$; and estimating a direction of arrival of the arriving signal based on the submatrices $R_1$ and $R_2$.

\* \* \* \* \*